US010700801B2

(12) United States Patent
Chen et al.

(10) Patent No.: US 10,700,801 B2
(45) Date of Patent: Jun. 30, 2020

(54) TECHNIQUES FOR MANAGING CELL IDENTIFIERS AND OTHER PARAMETERS FOR FLEXIBLE DUPLEX OPERATIONS

(71) Applicant: QUALCOMM Incorporated, San Diego, CA (US)

(72) Inventors: Wanshi Chen, San Diego, CA (US); Peter Gaal, San Diego, CA (US); Neng Wang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 15/763,500

(22) PCT Filed: Aug. 22, 2016

(86) PCT No.: PCT/CN2016/096204
§ 371 (c)(1),
(2) Date: Mar. 27, 2018

(87) PCT Pub. No.: WO2017/076107
PCT Pub. Date: May 11, 2017

(65) Prior Publication Data
US 2018/0316452 A1    Nov. 1, 2018

(30) Foreign Application Priority Data

Nov. 2, 2015   (WO) ................ PCT/CN2015/093594

(51) Int. Cl.
*H04J 11/00*    (2006.01)
*H04W 76/20*    (2018.01)
(Continued)

(52) U.S. Cl.
CPC .......... *H04J 11/0069* (2013.01); *H04B 7/024* (2013.01); *H04B 7/0413* (2013.01);
(Continued)

(58) Field of Classification Search
CPC ... H04J 11/0069; H04W 76/20; H04W 16/02; H04W 76/11; H04W 28/16; H04B 7/024; H04B 7/0413; H04L 5/0048
See application file for complete search history.

(56) References Cited

U.S. PATENT DOCUMENTS

2012/0113910 A1 *   5/2012   Jen ............................ H04L 1/16
370/329
2012/0258724 A1 *   10/2012  Kim .................... H04W 72/082
455/452.2
(Continued)

FOREIGN PATENT DOCUMENTS

CN        102026298 A     4/2011
CN        103428711 A     12/2013
(Continued)

OTHER PUBLICATIONS

International Search Report and Written Opinion—PCT/CN2016/096204—ISA/EPO—dated Nov. 25, 2016.
(Continued)

*Primary Examiner* — Ajay Cattungal
(74) *Attorney, Agent, or Firm* — Dalei Dong; Holland & Hart LLP

(57) ABSTRACT

Techniques are described for wireless communications at a user equipment (UE). One method includes determining a first cell identifier (ID) associated with a first downlink transmission in a first radio frequency spectrum band of paired radio frequency spectrum bands, determining a second cell ID associated with a second downlink transmission in a second radio frequency spectrum band of the paired radio frequency spectrum bands, and communicating based on the first cell ID and the second cell ID. In some cases, the method may include determining a cell ID associated with a downlink transmission in an uplink radio frequency spectrum band, and receiving the downlink transmission in a
(Continued)

subframe of the uplink radio frequency spectrum band. The downlink transmission may be based on the cell ID and a format of a physical uplink shared channel (PUSCH), and may include an eight layer single-user multiple-input multiple-output (SU-MIMO) transmission.

28 Claims, 10 Drawing Sheets

(51) Int. Cl.
| | | |
|---|---|---|
| H04W 16/02 | (2009.01) | |
| H04W 76/11 | (2018.01) | |
| H04B 7/024 | (2017.01) | |
| H04B 7/0413 | (2017.01) | |
| H04L 5/00 | (2006.01) | |
| H04W 28/16 | (2009.01) | |

(52) U.S. Cl.
CPC .......... *H04L 5/0048* (2013.01); *H04W 16/02* (2013.01); *H04W 28/16* (2013.01); *H04W 76/11* (2018.02); *H04W 76/20* (2018.02)

(56) References Cited

U.S. PATENT DOCUMENTS

| | | | | |
|---|---|---|---|---|
| 2012/0329468 A1* | 12/2012 | Chmiel | ............... | H04L 5/0007 455/450 |
| 2013/0034064 A1* | 2/2013 | Nam | ............... | H04W 72/1294 370/329 |
| 2013/0201942 A1 | 8/2013 | Kim et al. | | |
| 2014/0003375 A1* | 1/2014 | Nam | ............... | H04W 72/0406 370/329 |
| 2014/0036849 A1* | 2/2014 | Ribeiro | ............ | H04W 72/1263 370/329 |
| 2014/0044057 A1 | 2/2014 | Gaal et al. | | |
| 2014/0133367 A1* | 5/2014 | Chen | ................ | H04W 72/042 370/279 |
| 2014/0185573 A1* | 7/2014 | Yoon | ................ | H04J 11/0053 370/329 |
| 2014/0204848 A1* | 7/2014 | Geirhofer | ............ | H04B 7/0413 370/329 |
| 2014/0301329 A1* | 10/2014 | Kim | ................... | H04L 1/1861 370/329 |
| 2015/0222402 A1* | 8/2015 | Ouchi | ............... | H04W 72/0446 370/329 |
| 2015/0236883 A1 | 8/2015 | Yoon | | |
| 2015/0237518 A1 | 8/2015 | Seo et al. | | |
| 2015/0270918 A1* | 9/2015 | Lee | .................... | H04L 27/0012 370/329 |
| 2015/0282192 A1* | 10/2015 | Shin | ................... | H04W 72/082 370/329 |
| 2015/0334762 A1* | 11/2015 | Yang | ................... | H04W 76/15 370/329 |
| 2015/0365178 A1* | 12/2015 | Maattanen | .......... | H04B 17/345 370/329 |
| 2017/0230135 A1* | 8/2017 | Oh | .......................... | H04L 1/001 |

FOREIGN PATENT DOCUMENTS

| | | |
|---|---|---|
| WO | WO-2013070356 A1 | 5/2013 |
| WO | WO-2013141967 A1 | 9/2013 |
| WO | WO 2014113137 A1 | 7/2014 |
| WO | WO-2015163709 A1 | 10/2015 |

OTHER PUBLICATIONS

International Search Report and Written Opinion—PCT/CN2015/093594—ISA/EPO—dated Jul. 22, 2016.

Huawei et al., "New Study Item Proposal for Evolving LTE with Flexible Duplex", 3GPP Draft; RP-140061 SID Flexible Duplex, 3RDGeneration Partnership Project (3GPP), Mobile Competence Centre ; 650, Route Des Lucioles ; F-06921 Sophia-Antipolis Cedex; France, vol. TSG RAN, No. Fukuoka, Japan; Mar. 3, 2014-Mar. 6, 2014, Feb. 25, 2014 (Feb. 25, 2014), XP050780234, Retrieved from the Internet:URL:http://www.3gpp.org/ftp/Meetings_3GPP_SYNC/RAN/Docs/ [retrieved on Feb. 25, 2014], section 3.

Lei W et al., "Evolving LTE with Flexible Duplex", 2013 IEEE Globecom Workshops (GC Wkshps), IEEE, Dec. 9, 2013 (Dec. 9, 2013), pp. 49-54, XP032599994, DOI: 10.1109/GLOCOMW.2013.6824960 [retrieved on Jun. 3, 2014], sections I, II; figure 2.

Supplementary European Search Report—EP16861376—Search Authority—Munich—dated May 31, 2019.

* cited by examiner

| Uplink-Downlink Configuration | Downlink-to-Uplink Switching Periodicity | Subframe Number ||||||||||
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 2

TECHNIQUES FOR MANAGING CELL IDENTIFIERS AND OTHER PARAMETERS FOR FLEXIBLE DUPLEX OPERATIONS

CROSS REFERENCES

The present Application for Patent is a 371 national phase of International Patent Application No. PCT/CN2016/096204 by Qualcomm Incorporated et al., entitled "TECHNIQUES FOR MANAGING CELL IDENTIFIERS AND OTHER PARAMETERS FOR FLEXIBLE DUPLEX OPERATIONS," filed Aug. 22, 2016; which claims priority to 371 national phase of International Patent No. PCT/CN2015/093594 by Qualcomm Incorporated et al., entitled "TECHNIQUES FOR MANAGING CELL IDENTIFIERS AND OTHER PARAMETERS FOR FLEXIBLE DUPLEX OPERATIONS," filed. Nov. 2, 2015; each of which is assigned to the assignee hereof, and expressly incorporated by reference herein.

BACKGROUND

Field of the Disclosure

The present disclosure, for example, relates to wireless communication systems, and more particularly to techniques for managing cell identifiers and other parameters for flexible duplex operations.

Description of Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment (UE). A base station may communicate with UEs using a downlink radio frequency spectrum band (e.g., for transmissions from a base station to a UE) and an uplink radio frequency spectrum band (e.g., for transmissions from a UE to a base station). Under some conditions, downlink bandwidth or uplink bandwidth may be over-utilized or under-utilized.

SUMMARY

The present disclosure, for example, relates to techniques for managing cell identifiers and other parameters for flexible duplex operations. In scenarios in which a downlink radio frequency spectrum band is paired with an uplink radio frequency spectrum band, and the downlink radio frequency spectrum band is over-utilized, the uplink radio frequency spectrum band is under-utilized, or interference characteristics associated with the uplink radio frequency spectrum band differ from interference characteristics associated with the downlink radio frequency spectrum band, the uplink radio frequency spectrum band may be dynamically used for downlink transmissions. In these scenarios, cell identifiers (IDs), quasi-co-location (QCL) configurations, rate matching configurations, and other parameters or information may be separately managed for first downlink transmissions in the downlink radio frequency spectrum band and second downlink transmissions in the uplink radio frequency spectrum band.

A method for wireless communication at a UE is described. The method may include determining a first cell identifier (ID) associated with a first downlink transmission in a first radio frequency spectrum band of paired radio frequency spectrum bands, determining a second cell ID associated with a second downlink transmission in a second radio frequency spectrum band of the paired radio frequency spectrum bands, and communicating based at least in part on the first cell ID and the second cell ID.

In some examples of the method, the first radio frequency spectrum band may include a downlink radio frequency spectrum band and the second radio frequency spectrum band may include an uplink radio frequency spectrum band. In some examples, the method may further include determining a second QCL configuration for the second downlink transmission. In some examples, the second QCL configuration may be determined based at least in part on the first QCL configuration. In some examples the second QCL configuration may include at least a first reference signal received in the downlink radio frequency spectrum band and at least a second reference signal received in the uplink radio frequency spectrum band.

In some examples, the at least first reference signal may include at least one of a cell-specific reference signal (CRS) or a channel state information reference signal (CSI-RS), and the at least second reference signal may include at least one of a demodulation reference signal (DM-RS) or a sounding reference signal (SRS). In some examples, the method may further include determining a second rate matching configuration for the second downlink transmission. In some examples, the method may further include determining a first rate matching configuration for the first downlink transmission, and the second rate matching configuration may be determined based at least in part on the first rate matching configuration. In some examples, the second rate matching configuration may include at least one of: no CRS-related rate matching, or a second CRS-related rate matching associated with a more sparse CRS compared to a first CRS-related rate matching associated with the first downlink transmission, or a third CRS-related rate matching associated with a dynamically present CRS, or no control region-related rate matching compared to a control region-related rate matching associated with the first downlink transmission, or a combination thereof.

In some examples, the first cell ID may differ from the second cell ID, and the communicating may include receiving a first CRS associated with the first cell ID in the downlink radio frequency spectrum band, and receiving a second CRS associated with the second cell ID in the uplink radio frequency spectrum band. In some examples, the first cell ID and the second cell ID may include a same cell ID, and the communicating may include receiving a first CRS associated with the first cell ID in the downlink radio frequency spectrum band, and receiving a second CRS associated with the second cell ID in the uplink radio frequency spectrum band. In some examples, the method may further include determining a first channel state information (CSI) feedback for the first downlink transmission, and determining a second CSI feedback for the second downlink transmission.

In some examples, the method may further include receiving a CSI-RS in the downlink radio frequency spectrum band, and receiving a SRS in the uplink radio frequency spectrum band. The first CSI feedback may be based at least in part on the CSI-RS, and the second CSI feedback may be based at least in part on the SRS. In some examples, the communicating may include receiving a DRS. In some examples, the DRS may include at least a first reference signal received in the downlink radio frequency spectrum band and at least a second reference signal received in the uplink radio frequency spectrum band.

In some examples, the at least first reference signal may include at least one of a primary synchronization signal (PSS), or a secondary synchronization signal (SSS), or a CRS, and the at least second reference signal may include at least one of a CSI-RS or a SRS. In some examples, the first radio frequency spectrum band and the second radio frequency spectrum band may be associated with at least one of: different transmission power restrictions, or different interference characteristics, or a combination thereof. In some examples, the first cell ID and the second cell ID may include a same physical cell ID (PCI) or a same virtual cell ID (VCI).

In some examples, the method may further include receiving the second downlink transmission in a subframe of the second radio frequency spectrum band, the second downlink transmission based at least in part on the second cell ID and a format of a physical uplink shared channel (PUSCH), and the second downlink transmission comprising an eight layer single-user multiple-input multiple-output (SU-MIMO) transmission. In some examples, the second downlink transmission is associated with at least one of: eight different cyclic shifts in each of a first slot and a second slot of the subframe, or a first set of four different cyclic shifts in the first slot and a second set of four different cyclic shifts in the second slot, or the first set of four different cyclic shifts in a first frequency comb and the second set of four different cyclic shifts in a second frequency comb, or a combination thereof.

In one example, an apparatus for wireless communication at a UE is described. The apparatus may include means for determining a first cell ID associated with a first downlink transmission in a first radio frequency spectrum band of paired radio frequency spectrum bands, means for determining a second cell ID associated with a second downlink transmission in a second radio frequency spectrum band of the paired radio frequency spectrum bands, and means for communicating based at least in part on the first cell ID and the second cell ID.

In some examples of the apparatus, the first radio frequency spectrum band may include a downlink radio frequency spectrum band and the second radio frequency spectrum band may include an uplink radio frequency spectrum band. In some examples, the apparatus may further include means for determining a second QCL configuration for the second downlink transmission. In some examples, the apparatus may further include means for determining a first QCL configuration for the first downlink transmission, and the second QCL configuration may be determined based at least in part on the first QCL configuration. In some examples, the second QCL configuration may include at least a first reference signal received in the downlink radio frequency spectrum band and at least a second reference signal received in the uplink radio frequency spectrum band.

In some examples, the at least first reference signal may include at least one of a CRS or a CSI-RS, and the at least second reference signal may include at least one of a DM-RS or a SRS. In some examples, the apparatus may further include means for determining a second rate matching configuration for the second downlink transmission. In some examples, the apparatus may further include means for determining a first rate matching configuration for the first downlink transmission, and the second rate matching configuration may be determined based at least in part on the first rate matching configuration. In some examples, the second rate matching configuration may include at least one of: no CRS-related rate matching, or a second CRS-related rate matching associated with a more sparse CRS compared to a first CRS-related rate matching associated with the first downlink transmission, or a third CRS-related rate matching associated with a dynamically present CRS, or no control region-related rate matching compared to a control region-related rate matching associated with the first downlink transmission, or a combination thereof.

In some examples, the first cell ID may differ from the second cell ID, and the means for communicating may include means for receiving a first CRS associated with the first cell ID in the downlink radio frequency spectrum band, and means for receiving a second CRS associated with the second cell ID in the uplink radio frequency spectrum band. In some examples, the first cell ID and the second cell ID may include a same cell ID, and the means for communicating may include means for receiving a first CRS associated with the first cell ID in the downlink radio frequency spectrum band, and means for receiving a second CRS associated with the second cell ID in the uplink radio frequency spectrum band.

In some examples, the apparatus may further include means for determining a first CSI feedback for the first downlink transmission, and means for determining a second CSI feedback for the second downlink transmission. In some examples, the apparatus may further include means for receiving a CSI-RS in the downlink radio frequency spectrum band, and means for receiving a SRS in the uplink radio frequency spectrum band. The first CSI feedback may be based at least in part on the CSI-RS, and the second CSI feedback may be based at least in part on the SRS.

In some examples, the means for communicating may include means for receiving a DRS. In some examples, the DRS may include at least a first reference signal received in the downlink radio frequency spectrum band and at least a second reference signal received in the uplink radio frequency spectrum band. In some examples, the at least first reference signal may include at least one of a PSS, or a SSS, or a CRS, and the at least second reference signal may include at least one of a CSI-RS or a SRS. In some examples, the first radio frequency spectrum band and the second radio frequency spectrum band may be associated with at least one of: different transmission power restrictions, or different interference characteristics, or a combination thereof. In some examples, the first cell ID and the second cell ID may include a same PCI or a same VCI.

In some examples, the apparatus may further include means for receiving the second downlink transmission in a subframe of the second radio frequency spectrum band, the second downlink transmission based at least in part on the second cell ID and a format of a physical uplink shared channel (PUSCH), and the second downlink transmission comprising an eight layer single-user multiple-input multiple-output (SU-MIMO) transmission. In some examples, the second downlink transmission is associated with at least one of: eight different cyclic shifts in each of a first slot and a second slot of the subframe, or a first set of four different cyclic shifts in the first slot and a second set of four different cyclic shifts in the second slot, or the first set of four different cyclic shifts in a first frequency comb and the second set of four different cyclic shifts in a second frequency comb, or a combination thereof.

In one example, an apparatus for wireless communication at a UE may include a processor, and memory in electronic communication with the processor. The processor and the memory may be configured to determine a first cell ID associated with a first downlink transmission in a first radio frequency spectrum band of paired radio frequency spectrum bands, to determine a second cell ID associated with a second downlink transmission in a second radio frequency spectrum band of the paired radio frequency spectrum bands, and to communicate based at least in part on the first cell ID and the second cell ID.

In some examples, the first radio frequency spectrum band may include a downlink radio frequency spectrum band and the second radio frequency spectrum band may include an uplink radio frequency spectrum band. In some examples, the processor and the memory may be further configured to determine a second QCL configuration for the second downlink transmission. In some examples, the second QCL configuration may include at least a first reference signal received in the downlink radio frequency spectrum band and at least a second reference signal received in the uplink radio frequency spectrum band. In some examples, the processor and the memory may be further configured to determine a second rate matching configuration for the second downlink transmission. In some examples, the second rate matching configuration may include at least one of: no CRS-related rate matching, or a second CRS-related rate matching associated with a more sparse CRS compared to a first CRS-related rate matching associated with the first downlink transmission, or a third CRS-related rate matching associated with a dynamically present CRS, or no control region-related rate matching compared to a control region-related rate matching associated with the first downlink transmission, or a combination thereof.

In some examples, the first cell ID may differ from the second cell ID, and the communicating may include receiving a first CRS associated with the first cell ID in the downlink radio frequency spectrum band, and receiving a second CRS associated with the second cell ID in the uplink radio frequency spectrum band. In some examples, the first cell ID and the second cell ID may include a same cell ID, and the communicating may include receiving a first CRS associated with the first cell ID in the downlink radio frequency spectrum band, and receiving a second CRS associated with the second cell ID in the uplink radio frequency spectrum band. In some examples, the processor and the memory may be further configured to determine a first CSI feedback for the first downlink transmission, and determine a second CSI feedback for the second downlink transmission. In some examples, the communicating may include receiving a DRS. In some examples, the DRS may include at least a first reference signal received in the downlink radio frequency spectrum band and at least a second reference signal received in the uplink radio frequency spectrum band.

In one example, a non-transitory computer-readable medium storing computer-executable code for wireless communication is described. The code may be executable by a processor to determine a first cell ID associated with a first downlink transmission in a first radio frequency spectrum band of paired radio frequency spectrum bands, to determine a second cell ID associated with a second downlink transmission in a second radio frequency spectrum band of the paired radio frequency spectrum bands, and to communicate based at least in part on the first cell ID and the second cell ID.

In some examples of the non-transitory computer-readable medium, the first radio frequency spectrum band may include a downlink radio frequency spectrum band and the second radio frequency spectrum band may include an uplink radio frequency spectrum band. In some examples, the code may be further executable by the processor to determine a second QCL configuration for the second downlink transmission. In some examples, the second QCL configuration may include at least a first reference signal received in the downlink radio frequency spectrum band and at least a second reference signal received in the uplink radio frequency spectrum band.

In some examples, the code may be further executable by the processor to determine a second rate matching configuration for the second downlink transmission. In some examples, the second rate matching configuration may include at least one of: no CRS-related rate matching, or a second CRS-related rate matching associated with a more sparse CRS compared to a first CRS-related rate matching associated with the first downlink transmission, or a third CRS-related rate matching associated with a dynamically present CRS, or no control region-related rate matching compared to a control region-related rate matching associated with the first downlink transmission, or a combination thereof.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 2 shows a plurality of time domain duplexing (TDD) uplink-downlink configurations for a radio frame, in accordance with various aspects of the present disclosure;

DETAILED DESCRIPTION

Techniques are described in which cell identifiers, quasi-co-location configurations, rate matching configurations, and other parameters or information may be separately managed for a first downlink transmission in a downlink radio frequency spectrum band and a second downlink transmission in an uplink radio frequency spectrum band. The downlink radio frequency spectrum band may be paired with the uplink radio frequency spectrum band, and in some examples, the downlink radio frequency spectrum band and the uplink radio frequency spectrum band may be paired for frequency domain duplexing (FDD) operation.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features and techniques described with respect to some examples may be combined in other examples.

Figure 1:
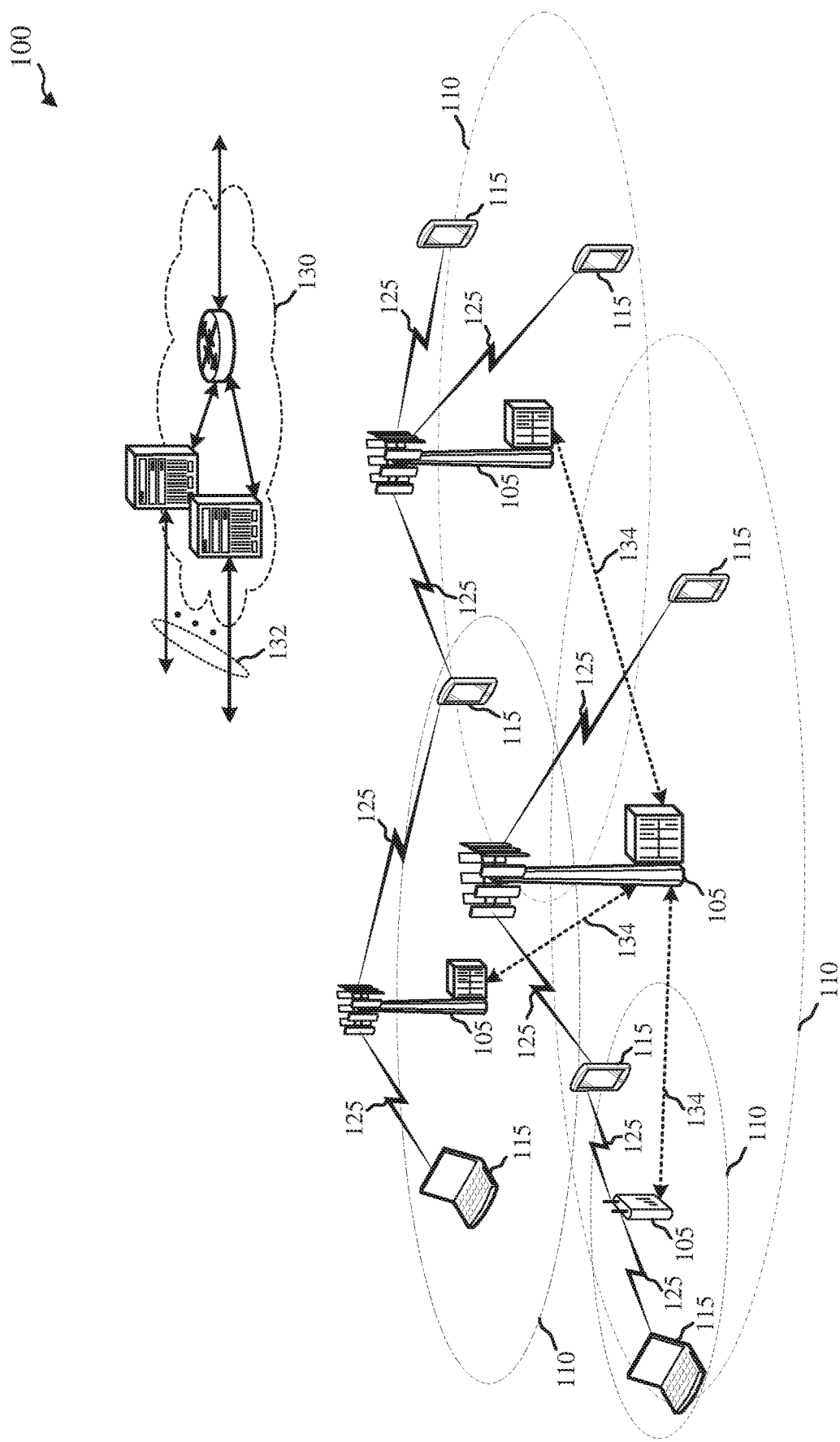
FIG. 1 illustrates an example of a wireless communication system, in accordance with various aspects of the present disclosure.

FIG. 1 illustrates an example of a wireless communication system 100, in accordance with various aspects of the present disclosure. The wireless communication system 100 may include base stations 105, UEs 115, and a core network 130. The core network 130 may provide user authentication, access authorization, tracking, Internet Protocol (IP) connectivity, and other access, routing, or mobility functions. The base stations 105 may interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X2, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, a base station 105 may be referred to as a base transceiver station, a radio base station, an access point, a radio transceiver, a NodeB, an eNodeB (eNB), a Home NodeB, a Home eNodeB, or some other suitable terminology. The geographic coverage area 110 for a base station 105 may be divided into sectors making up a portion of the coverage area (not shown). The wireless communication system 100 may include base stations 105 of different types (e.g., macro or small cell base stations). There may be overlapping geographic coverage areas 110 for different technologies.

In some examples, the wireless communication system 100 may include a Long-Term Evolution (LTE)/LTE-Advanced (LTE-A) network or a next generation network (e.g., a 5G network). In LTE/LTE-A networks, the term evolved Node B (eNB) may be used to describe the base stations 105, while the term UE may be used to describe the UEs 115. The wireless communication system 100 may be a heterogeneous network in which different types of eNBs provide coverage for various geographical regions. For example, each eNB or base station 105 may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

A macro cell may cover a relatively large geographic area (e.g., several kilometers in radius) and may allow unrestricted access by UEs with service subscriptions with the network provider. A small cell may be a lower-powered base station, as compared with a macro cell that may operate in the same or different (e.g., licensed, shared, etc.) radio frequency spectrum bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG). UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or packet data convergence protocol (PDCP) layer may be IP-based. A radio link control (RLC) layer may perform packet segmentation and reassembly to communicate over logical channels. A medium access control (MAC) layer may perform priority handling and multiplexing of logical channels into transport channels. The MAC layer may also use hybrid automatic repeat request (HARQ) to provide retransmission at the MAC layer to improve link efficiency. In the control plane, the radio resource control (RRC)

protocol layer may provide establishment, configuration, and maintenance of an RRC connection between a UE 115 and the base stations 105 or core network 130 supporting radio bearers for the user plane data. At the physical (PHY) layer, the transport channels may be mapped to physical channels.

The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment, including macro eNBs, small cell eNBs, relay base stations, and the like.

The communication links 125 shown in wireless communication system 100 may include downlink transmissions, from a base station 105 to a UE 115, or uplink transmissions, from a UE 115 to a base station 105. The downlink transmissions may also be called forward link transmissions, while the uplink transmissions may also be called reverse link transmissions.

In some examples, each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using a FDD operation (e.g., using paired radio frequency spectrum resources) or a time domain duplexing (TDD) operation (e.g., using unpaired radio frequency spectrum resources). Frame structures for FDD operation (e.g., frame structure type 1) and TDD operation (e.g., frame structure type 2) may be defined.

In some examples of the wireless communication system 100, base stations 105 or UEs 115 may include multiple antennas for employing antenna diversity schemes to improve communication quality and reliability between base stations 105 and UEs 115. Additionally or alternatively, base stations 105 or UEs 115 may employ multiple-input, multiple-output (MIMO) techniques that may take advantage of multi-path environments to transmit multiple spatial layers carrying the same or different coded data.

The wireless communication system 100 may support operation on multiple cells or carriers, a feature which may be referred to as carrier aggregation (CA) or dual-connectivity operation. A carrier may also be referred to as a component carrier (CC), a layer, a channel, etc. The terms "carrier," "component carrier," "cell," and "channel" may be used interchangeably herein. Carrier aggregation may be used with both FDD and TDD component carriers.

In a network, a UE 115 may be configured to communicate using up to five CCs when operating in a carrier aggregation mode or dual-connectivity mode. One or more of the CCs may be configured as a downlink CC, and one or more of the CCs may be configured as an uplink CC. Also, one of the CCs allocated to a UE 115 may be configured as a primary CC (PCC), and the remaining CCs allocated to the UE 115 may be configured as secondary CCs (SCCs).

FIG. 2 shows a plurality of TDD uplink-downlink configurations 200 for a radio frame, in accordance with various aspects of the present disclosure. The TDD uplink-downlink configurations may be used for communications between base stations and UEs (e.g., between the base stations 105 and UEs 115 described with reference to FIG. 1), and in some examples may be used by base stations and UEs operating in accordance with enhanced interference mitigation and traffic adaptation (eIMTA). Each of the TDD uplink-downlink configurations may include a number of uplink (U) subframes, a number of downlink (D) subframes, and a number of special (S) subframes. A TDD uplink-downlink configuration may switch from D subframes to U subframes during (or following) an S subframe.

By way of example, the TDD uplink-downlink configurations may include seven TDD uplink-downlink configurations (numbered 0-6). The TDD uplink-downlink configurations may include a first set of TDD uplink-downlink configurations (e.g., TDD uplink-downlink configurations 0, 1, 2, and 6) having a first switching periodicity of 5 milliseconds (ms), and a second set of TDD uplink-downlink configurations (e.g., TDD uplink-downlink configurations 3, 4, and 5) having a second switching periodicity of 10 ms. Each TDD uplink-downlink configuration in the first set may include one S subframe per radio frame, and each TDD uplink-downlink configuration in the second set may include two S subframes per radio frame.

Figure 3:
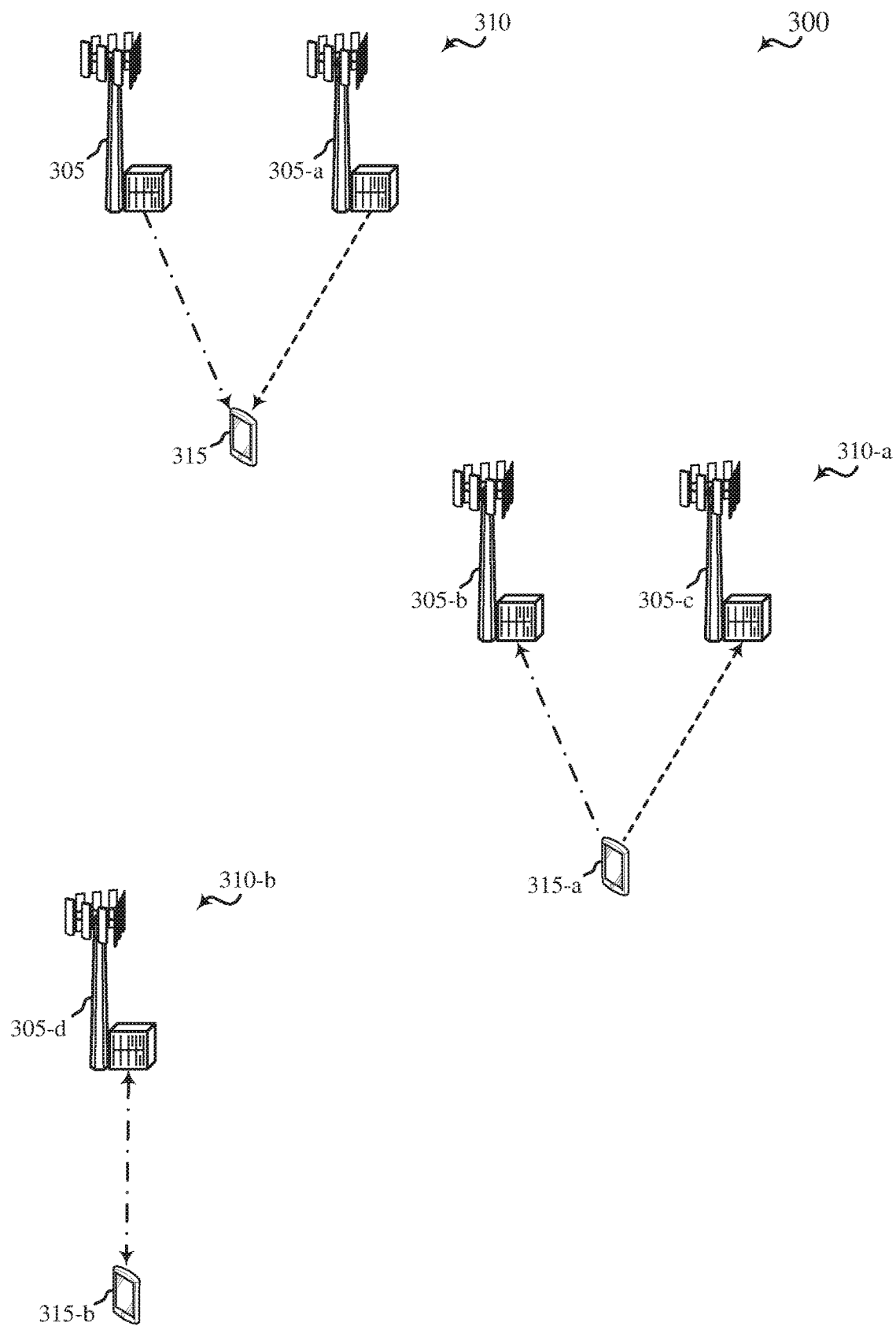
FIG. 3 shows examples of Coordinated Multipoint (CoMP) transmission schemes, in accordance with various aspects of the present disclosure.

FIG. 3 shows examples 300 of Coordinated Multipoint (CoMP) transmission schemes, in accordance with various aspects of the present disclosure. Each of the CoMP transmission schemes may provide communications between one or more base stations and a UE (e.g., between one or more of the base stations 105 described with reference to FIG. 1 and a UE 115 described with reference to FIG. 1). By way of example, FIG. 3 illustrates a downlink CoMP transmission scheme 310, an uplink CoMP transmission scheme 310-*a*, and a coordinated beamforming (CBF) transmission scheme 310-*b*. In some examples, a dynamic point(s) selection (DPS) transmission scheme may be used in conjunction with the downlink CoMP transmission scheme 310, the uplink CoMP transmission scheme 310-*a*, or the CBF transmission scheme 310-*b*.

A downlink CoMP transmission scheme 310 may enable coordinated transmissions (e.g., joint transmissions) of data (e.g., the same data) from multiple base stations or eNBs (e.g., from a first base station 305 and a second base station 305-*a*) to a UE 315. An uplink CoMP transmission scheme 310-*a* may enable coordinated receptions (e.g., joint receptions) of data (e.g., the same data), transmitted by a UE 315-*a*, at multiple base stations or eNBs (e.g., at a third base station 305-*b* and a fourth base station 305-*c*), downlink CoMP and uplink CoMP may be separately or jointly enabled for a UE. A CBF transmission scheme 310-*b* may enable a base station 305-*d* to transmit to a UE 315-*b* using multiple antennas, which antennas may be controlled to form beams that can reduce interference with UEs of neighboring cells. A DPS transmission scheme may be used in conjunction with the downlink CoMP transmission scheme 310, the uplink CoMP transmission scheme 310-*a*, or the CBF transmission scheme 310-*b*, and may involve changing the cells involved in downlink transmissions or uplink transmissions from one subframe to another subframe.

CoMP transmission schemes may be used in homogeneous and/or heterogeneous networks (HetNets). Base station nodes involved in a CoMP transmission scheme may be coupled, for example, using a X2 interface or fiber. In a HetNet CoMP transmission scheme, a low power node may sometimes be called a remote radio head (RRH). In some examples, one or more virtual cell identifiers (VCIs) may be configured for physical downlink shared channel (PDSCH) demnodulation reference signal (DM-RS), to enable more efficient CoMP operation at a UE. For example, a UE may be dynamically indicated which VCI is to be used for PDSCH in a subframe.

In some examples, cell IDs may be managed as follows. For downlink transmissions in a downlink radio frequency spectrum band, a physical downlink control channel (PDCCH) may be based on a physical cell identifier (PCI). A PDSCH DM-RS may be based on a PCI or one of two VCIs configured for a UE (with PDSCH data scrambling being based on the PCI). An enhanced PDCCH (EPDCCH) DM-RS may be based on the PCI or a VCI (with EPDCCH data scrambling being based on the PCI). For uplink transmissions in an uplink radio frequency spectrum band, a physical uplink shared channel (PUSCH) DM-RS may be based on the PCI or a VCI configured for a UE (with PUSCH data scrambling being based on the PCI). The same PCI may be used for both the downlink transmissions and the uplink transmissions of a same cell.

For CoMP transmission schemes, dynamic PDSCH rate matching and quasi-co-location (QCL) configurations may be supported. A UE may be indicated, via a 2-bit indicator in downlink control information (DCI), a set of rate matching parameters for each PDSCH transmission. Each set of rate matching parameters may be selected from up to four sets of rate matching parameters configured for the UE. Dynamic PDSCH rate matching can facilitate operations such as DPS, in which the transmission of a PDSCH may be dynamically switched from one cell to another cell. With respect to QCL configurations, a UE may be indicated a non-zero-power channel state information reference signal (CSI-RS) which can be assumed to be quasi-co-located with a DM-RS and a CRS, in order to facilitate time and/or frequency tracking and PDSCH demodulation.

In some examples, it may be useful to communicate using first downlink transmissions and second downlink transmissions in a FDD mode, where the first downlink transmissions are transmitted/received in a first radio frequency spectrum band (e.g., a downlink radio frequency spectrum band) of paired radio frequency spectrum bands, and where the second downlink transmissions transmitted/received in a second radio frequency spectrum band (e.g., an uplink radio frequency spectrum band) of the paired radio frequency spectrum bands. Similar to the TDD uplink-downlink configurations described with reference to FIG. 2, the first downlink transmissions and second downlink transmissions may adaptively accommodate dynamic traffic variations in the downlink radio frequency spectrum band and the uplink radio frequency spectrum band. The first downlink transmissions and the second downlink transmissions may include downlink control transmissions and/or downlink data transmissions. Techniques disclosed in the present disclosure may be used to manage, for example, cell IDs. QCL configurations, and/or rate matching configurations associated with the first downlink transmissions and the second downlink transmissions.

A first downlink transmission in a first radio frequency spectrum band (e.g., a downlink radio frequency spectrum band) and a second downlink transmission in a second radio frequency spectrum band (e.g., an uplink radio frequency spectrum band) may be associated with the same or different transmission power restrictions or interference characteristics. For example, a first downlink transmission in a downlink radio frequency spectrum band may be associated with a maximum transmission power of 46 dBm, and a second downlink transmission in an uplink radio frequency spectrum band may be associated with a maximum transmission power of 23 dBm (i.e., a difference of up to 23 dBm). Such a difference in maximum transmission powers may result in the first downlink transmission and the second downlink transmission being associated with different inter-cell interferences and/or different cell coverage areas, which differences may have a significant impact on CoMP operations. However, in an example including transmissions from small cells, a first downlink transmission in a downlink radio frequency spectrum band may be associated with a maximum transmission power of 30 dBm, and a second downlink transmission in an uplink radio frequency spectrum band may be associated with a maximum transmission power of 23 dBm (i.e., a difference of up to 7 dBm). Such a difference in maximum transmission powers (for small cells) may not have a significant impact on CoMP operations.

With respect to interference characteristics associated with downlink transmissions in a downlink radio frequency spectrum band and an uplink radio frequency spectrum band, interference with a first downlink transmission in the downlink radio frequency spectrum band may be from downlink transmissions of other cells (e.g., other base stations), but interference with a second downlink transmission in the uplink radio frequency spectrum band may be from downlink transmissions of other cells (e.g., transmissions of other base stations) or uplink transmissions of other cells (e.g., transmissions of other UEs).

Given the potential differences (e.g., transmission power restrictions or interference characteristics) associated with downlink transmissions in a first radio frequency spectrum band (e.g., a downlink radio frequency spectrum band) and a second radio frequency spectrum band (e.g., an uplink radio frequency spectrum band) of paired radio frequency spectrum bands, one or more of cell IDs. QCL configurations, and/or rate matching configurations associated with the first downlink transmission and the second downlink transmission may be separately managed (e.g., by a base station and UE).

With respect to cell IDs, cell ID management for a UE may include, for example, determining cell IDs for downlink transmissions in a downlink radio frequency spectrum band, downlink transmissions in an uplink radio frequency spectrum band, and uplink transmissions in the uplink radio frequency spectrum band. Although the cell IDs may be separately determined (or managed), two or more of the cell IDs may include a same cell ID or different cell IDs. In some examples, a first cell ID (e.g., for a first downlink transmission in the downlink radio frequency spectrum band) and a second cell ID (e.g., for a second downlink transmission in the uplink radio frequency spectrum band) may include a same PCI or a same VCI. In some examples, a same VCI may be useful for small cells, in which CoMP operations for the first downlink transmission and the second downlink transmission are similar. In some examples, a same PCI may be used for a first downlink transmission in the downlink radio frequency spectrum band, a second downlink transmission in the uplink radio frequency spectrum band, and an uplink transmission in the uplink radio frequency spectrum band (e.g., when a VCI is not configured or not used).

With respect to QCL configurations and rate matching configurations, a first QCL configuration and first rate matching configuration for a first downlink transmission (in a downlink radio frequency spectrum band) and a second QCL configuration and second rate matching configuration for a second downlink transmission (in an uplink radio frequency spectrum band) may be determined by a UE. Although the first QCL configuration and the second QCL configuration may be separately determined (or managed), and the first rate matching configuration and second rate matching configuration may be separately determined (or managed), the second QCL configuration may in some examples be determined based on the first QCL configuration, and the second rate matching configuration may in some examples be determined based on the first rate matching configuration.

Some parameters of the first QCL configuration and the second QCL configuration may differ, as may parameters of the first rate matching configuration and the second rate matching configuration, even when the second QCL configuration is determined based on the first QCL configuration or the second rate matching configuration is determined based on the first rate matching configuration. For example, for downlink transmissions in an uplink radio frequency spectrum band, there may be no CRS-related rate matching, or there may be CRS-related rate matching that differs from CRS-related rate matching for downlink transmissions in the downlink radio frequency spectrum hand.

With respect to different configurations of CRS-related rate matching, a CRS may be provided in just some downlink transmissions in an uplink radio frequency spectrum band. For example, the second rate matching configuration may include at least one of: a second CRS-related rate matching associated with a more sparse CRS compared to a first CRS-related rate matching associated with a downlink transmission in the downlink radio frequency spectrum band, or a third CRS-related rate matching associated with a dynamically present CRS. When a CRS is provided in just some downlink transmissions in an uplink radio frequency spectrum band, PDSCH rate matching around a CRS provided in a first downlink transmission in a downlink radio frequency spectrum band may differ from PDSCH rate matching around a CRS provided in a second downlink transmission in an uplink radio frequency spectrum band.

For a downlink transmission in a downlink radio frequency spectrum band, at least one control symbol period (e.g., an OFDM symbol period) may be allocated to a control region, and PDSCH and EPDCCH may not have modulation symbols mapped to the control region. In some examples, the control region allocated for the downlink transmission in the downlink radio frequency spectrum band may be used to schedule downlink transmissions in an uplink radio frequency spectrum band (e.g., cross-spectrum scheduling may be provided for the downlink transmissions in the uplink radio frequency spectrum band). In some examples, part of the control region allocated in the downlink transmission in the downlink radio frequency spectrum band may be allocated for scheduling legacy transmissions in the downlink radio frequency spectrum band. In other examples, the part of the control region allocated for scheduling legacy transmissions may instead be allocated for cross-spectrum scheduling of downlink transmissions in the uplink radio frequency spectrum band (i.e., a same part of the control region may be used to provide scheduling for legacy transmissions in the downlink radio frequency spectrum band or scheduling for downlink transmissions in the uplink radio frequency spectrum band).

In some examples, a first QCL configuration for a first downlink transmission in a downlink radio frequency spectrum band may include at least one parameter that differs from a corresponding parameter of a second QCL configuration for a second downlink transmission in an uplink radio frequency spectrum band. For example, the first QCL configuration may include at least one reference signal transmitted/received in the downlink radio frequency spectrum band, and the second QCL configuration may include at least a first reference signal transmitted/received in the downlink radio frequency spectrum band and at least a second reference signal transmitted/received in the uplink radio frequency spectrum band (e.g., cross-spectrum QCL operation may be provided for the second downlink transmission). In some examples, the first QCL configuration may include a CRS, a DM-RS, or a CSI-RS in the downlink radio frequency spectrum band.

In some examples, the at least first reference signal of the second QCL configuration may include at least one of a CRS or a CSI-RS, and the at least second reference signal of the second QCL configuration may include at least one of a DM-RS or a SRS. In an alternative, the at least first reference signal of the second QCL configuration may include at least one of a CRS, and the at least second reference signal of the second QCL configuration may include at least one of a DM-RS or a CSI-RS. In another alternative, the second QCL configuration may include a CRS, a DM-RS, and a CSI-RS in the uplink radio frequency spectrum band, but the CRS in the uplink radio frequency spectrum band may be more sparse than a CRS in the downlink radio frequency spectrum band. In another alternative, the at least first reference signal in the downlink radio frequency spectrum band may include a CRS and a CSI-RS, and the at least second reference signal in the uplink radio frequency spectrum band may include a DM-RS. When a CRS is provided for both the first downlink transmission in the downlink radio frequency spectrum band and the second downlink transmission in the uplink radio frequency spectrum band, a same cell ID or different cell IDs may be associated with the different CRSs.

In some examples, a first CSI feedback may be determined for a first downlink transmission in a downlink radio frequency spectrum band, and a second CSI feedback may be determined for a second downlink transmission in an uplink radio frequency spectrum hand (e.g., the first CSI feedback for the first downlink transmission and the second CSI feedback for the second downlink transmission may be separately managed). In some examples, the first CSI feedback may be based on a CSI-RS in the downlink radio frequency spectrum band, and the second CSI feedback may be based on a SRS in the uplink radio frequency spectrum band. In some examples, the number of antenna ports for the SRS may be increased from four to eight using different cyclic shifts and/or frequency combs.

In some examples, a demodulation reference signal (DRS) may be transmitted/received at least partly in an uplink radio frequency spectrum band for downlink operations. For example, a DRS may include at least a first reference signal transmitted/received in a downlink radio frequency spectrum band, and at least a second reference signal transmitted/received in an uplink radio frequency spectrum band. In some examples, the at least first reference signal may include at least one of a primary synchronization signal (PSS), or a secondary synchronization signal (SSS), or a CRS, and the at least second reference signal may include at least one of a CSI-RS or a SRS. In some examples, the at least first reference signal may be associated with a first cell ID, and the at least second reference signal may be associated with a second cell ID. The first cell ID and the second cell ID may include a same cell ID or different cell IDs (e.g., the cell IDs may be separately managed).

In some cases, a PUSCH may support four layer (4-layer) MIMO operation, with the 4-layer DM-RSs being differentiated by different cyclic shifts (e.g., cyclic shift values of 0, 3, 6, and 9 for the four layers). When a downlink transmission in an uplink radio frequency spectrum band is based on an uplink waveform (e.g., a PUSCH), support for eight layer (8-layer) single user MIMO (SU-MIMO) operation may be desirable. In some examples, an eight layer SU-MIMO transmission may be supported by associating a downlink transmission with at least one of: eight different cyclic shifts in each of a first slot and a second slot of a subframe, a first set of four different cyclic shifts in the first slot and a second set of four different cyclic shifts in the second slot, a first set of four different cyclic shifts in a first frequency comb and a second set of four different cyclic shifts in a second frequency comb, or a combination thereof.

Figure 4:
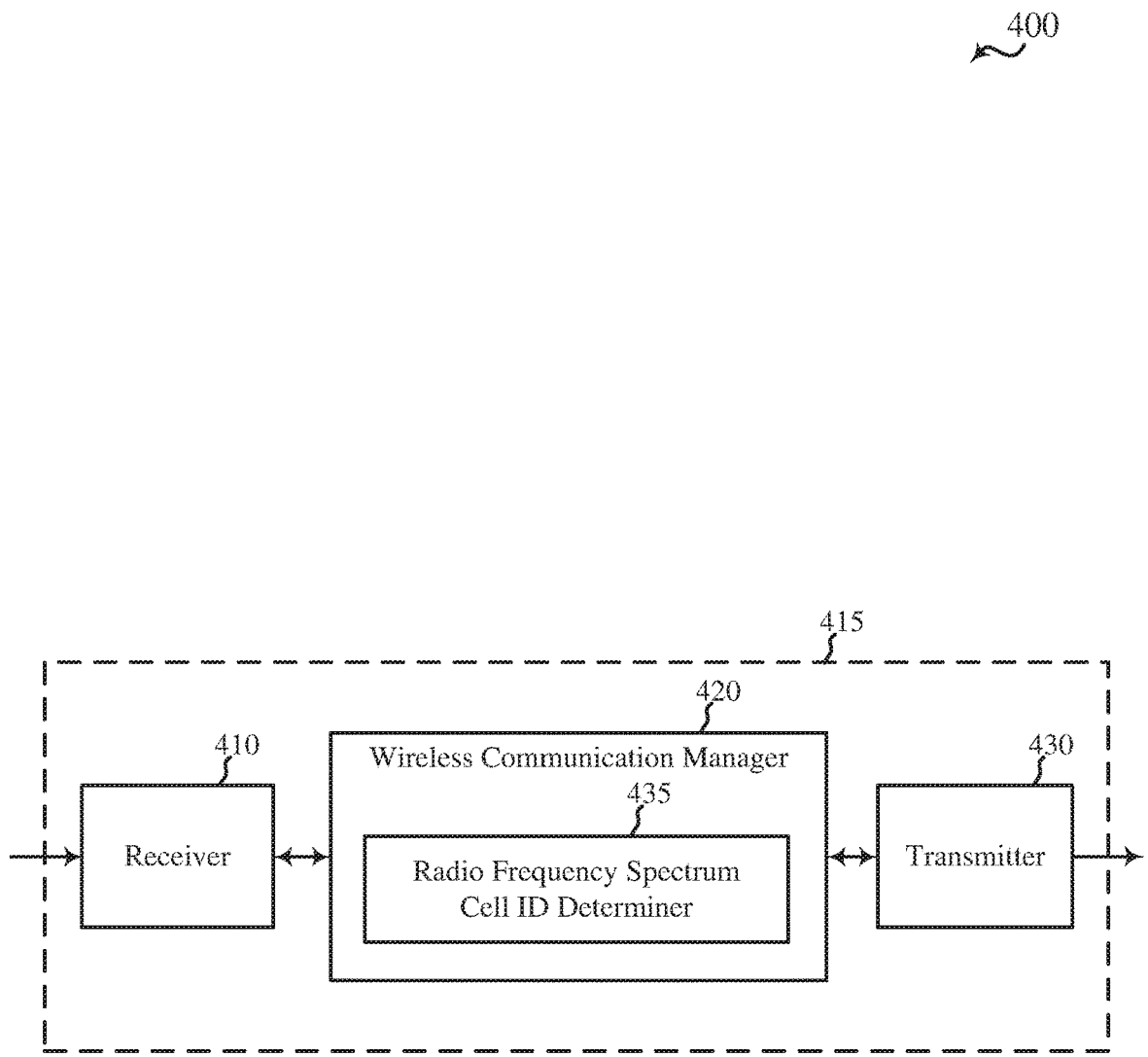
FIG. 4 shows a block diagram of an apparatus for use in wireless communication, in accordance with various aspects of the present disclosure.

FIG. 4 shows a block diagram 400 of an apparatus 415 for use in wireless communication, in accordance with various aspects of the present disclosure. The apparatus 415 may be an example of aspects of one or more of the UEs 115, 315, 315-a, or 315-b described with reference to FIG. 1 or 3. The apparatus 415 may also be or include a processor. The apparatus 415 may include a receiver 410, a wireless communication manager 420, or a transmitter 430. Each of these components may be in communication with each other.

The components of the apparatus 415 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 410 may include at least one radio frequency receiver, such as at least one radio frequency receiver operable to receive transmissions over one or more radio frequency spectrum bands. In some examples, one or more of the radio frequency spectrum bands may be used for wireless communications, as described, for example, with reference to FIG. 1, 2, or 3. The receiver 410 may be used to receive various types of data or control signals (i.e., transmissions) over one or more communication links of a wireless communication system, such as one or more communication links of the wireless communication system 100 or 300 described with reference to FIG. 1 or 3.

In some examples, the transmitter 430 may include at least one radio frequency transmitter, such as at least one radio frequency transmitter operable to transmit over the one or more radio frequency spectrum bands. The transmitter 430 may be used to transmit various types of data or control signals (i.e., transmissions) over one or more communication links of a wireless communication system, such as one or more communication links of the wireless communication system 100 or 300 described with reference to FIG. 1 or 3.

In some examples, the wireless communication manager 420 may be used to manage one or more aspects of wireless communication for the apparatus 415. In some examples, part of the wireless communication manager 420 may be incorporated into or shared with the receiver 410 or the transmitter 430. In some examples, the wireless communication manager 420 may include a radio frequency spectrum cell ID determiner 435.

The radio frequency spectrum cell ID determiner 435 may be used to determine a first cell ID associated with a first downlink transmission in a first radio frequency spectrum band of paired radio frequency spectrum bands. The radio frequency spectrum cell ID determiner 435 may also be used to determine a second cell ID associated with a second downlink transmission in a second radio frequency spectrum band of the paired radio frequency spectrum bands. The wireless communication manager 420 may communicate based on the first cell ID and/or the second cell ID.

In some examples of the apparatus 415, the first radio frequency spectrum band may include a downlink radio frequency spectrum band and the second radio frequency spectrum band may include an uplink radio frequency spectrum band. In some examples, the first radio frequency spectrum band and the second radio frequency spectrum band may be associated with at least one of: different transmission power restrictions, different interference characteristics, or a combination thereof. Alternatively, the first radio frequency spectrum band and the second radio frequency spectrum band may be associated with a same set of power restrictions, and/or the first radio frequency spectrum band and the second radio frequency spectrum band may be associated with a same set of interference characteristics. The first cell ID and the second cell ID may include a same cell ID or different cell IDs. In some examples, the first cell ID and the second cell ID may include a same PCI or a same VCI.

Figure 5:
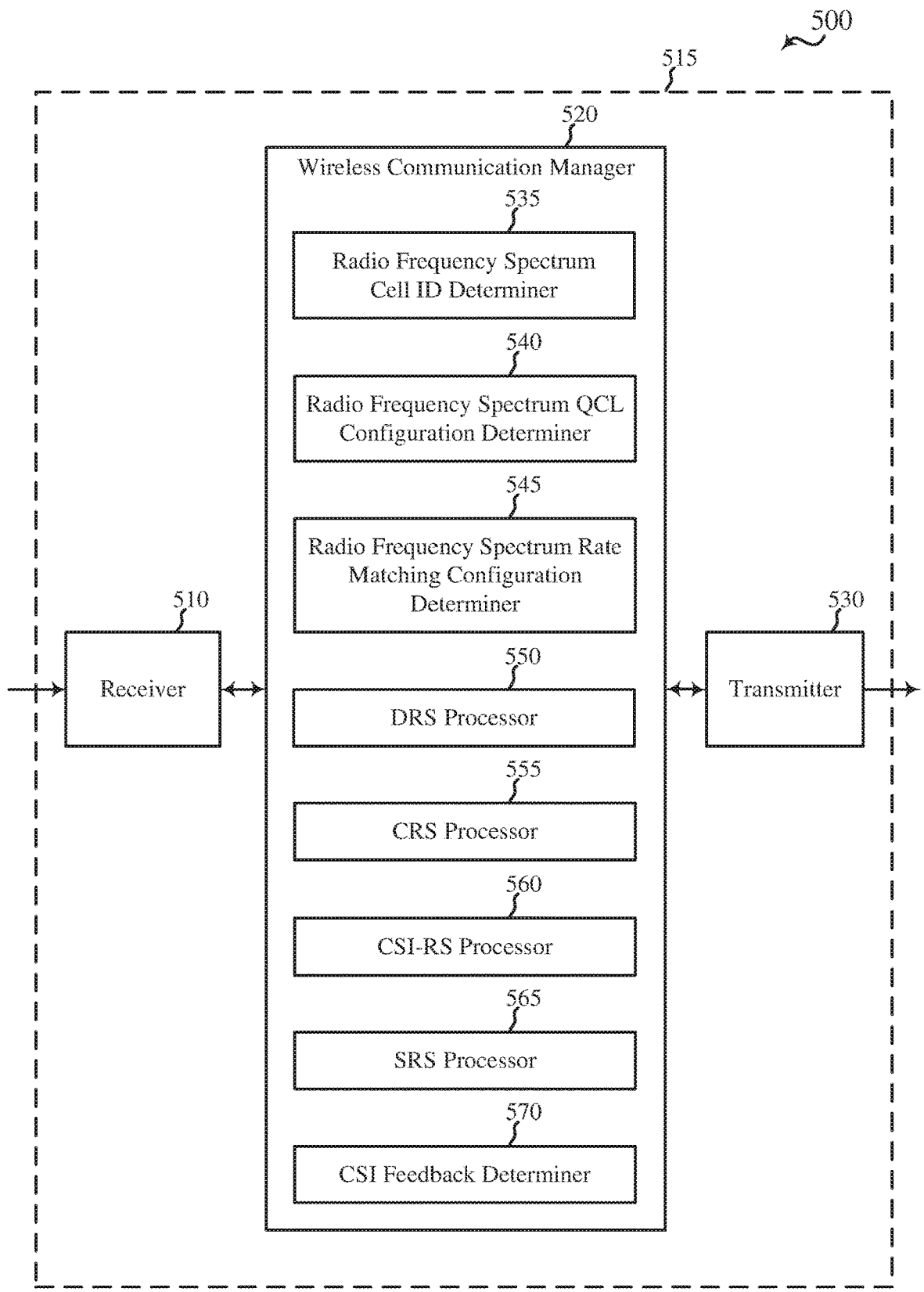
FIG. 5 shows a block diagram of an apparatus for use in wireless communication, in accordance with various aspects of the present disclosure.

FIG. 5 shows a block diagram 500 of an apparatus 515 for use in wireless communication, in accordance with various aspects of the present disclosure. The apparatus 515 may be an example of aspects of one or more of the UEs 115, 315, 315-a, or 315-b described with reference to FIG. 1 or 3, or aspects of the apparatus 415 described with reference to FIG. 4. The apparatus 515 may also be or include a processor. The apparatus 515 may include a receiver 510, a wireless communication manager 520, or a transmitter 530. Each of these components may be in communication with each other.

The components of the apparatus 515 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, an SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 510 may include at least one radio frequency receiver, such as at least one radio frequency receiver operable to receive transmissions over one or more radio frequency spectrum bands. In some examples, one or more of the radio frequency spectrum bands may be used for wireless communications, as described, for example, with reference to FIG. 1, 2, or 3. The receiver 510 may be used to receive various types of data or control signals (i.e., transmissions) over one or more communication links of a wireless communication system, such as one or more communication links of the wireless communication system 100 or 300 described with reference to FIG. 1 or 3.

In some examples, the transmitter 530 may include at least one radio frequency transmitter, such as at least one radio frequency transmitter operable to transmit over the one or more radio frequency spectrum bands. The transmitter 530 may be used to transmit various types of data or control signals (i.e., transmissions) over one or more communication links of a wireless communication system, such as one or more communication links of the wireless communication system 100 or 300 described with reference to FIG. 1 or 3.

In some examples, the wireless communication manager 520 may be used to manage one or more aspects of wireless communication for the apparatus 515. In some examples, part of the wireless communication manager 520 may be incorporated into or shared with the receiver 510 or the transmitter 530. In some examples, the wireless communication manager 520 may include a radio frequency spectrum cell ID determiner 535, a radio frequency spectrum QCL configuration determiner 540, a radio frequency spectrum rate matching configuration determiner 545, a DRS processor 550, a CRS processor 555, a CSI-RS processor 560, a SRS processor 565, or a CSI feedback determiner 570.

The radio frequency spectrum cell ID determiner 535 may be used to determine a first cell ID associated with a first downlink transmission in a downlink radio frequency spectrum band of paired radio frequency spectrum bands. The radio frequency spectrum cell ID determiner 535 may also be used to determine a second cell ID associated with a second downlink transmission in an uplink radio frequency spectrum band of the paired radio frequency spectrum bands.

In some examples of the apparatus 515, the downlink radio frequency spectrum band and the uplink radio frequency spectrum band may be associated with at least one of: different transmission power restrictions, different interference characteristics, or a combination thereof. Alternatively, the downlink radio frequency spectrum band and the uplink radio frequency spectrum band may be associated with a same set of power restrictions, and/or the downlink radio frequency spectrum band and the uplink radio frequency spectrum band may be associated with a same set of interference characteristics. The first cell ID and the second cell ID may include a same cell ID or different cell IDs. In some examples, the first cell ID and the second cell ID may include a same PCI or a same VCI.

The radio frequency spectrum QCL configuration determiner 540 may be used to determine a first QCL configuration for the first downlink transmission or a second QCL configuration for the second downlink transmission. In some examples, the radio frequency spectrum QCL configuration determiner 540 may determine the second QCL configuration based on the first QCL configuration. In some examples, the second QCL configuration may include at least one parameter that differs from a corresponding at least one parameter of the first QCL configuration. For example, the first QCL configuration may include at least one reference signal transmitted/received in the downlink radio frequency spectrum band, and the second QCL configuration may include at least a first reference signal transmitted/received in the downlink radio frequency spectrum band and at least a second reference signal transmitted/received in the uplink radio frequency spectrum band. In some examples, the at least first reference signal may include at least one of a CRS or a CSI-RS, and the at least second reference signal may include at least one of a DM-RS or a SRS.

In some examples of the apparatus 515, the second QCL configuration may include at least one parameter that differs from a corresponding at least one parameter of the first QCL configuration. For example, the first QCL configuration may include at least one reference signal transmitted/received in the downlink radio frequency spectrum band, and the second QCL configuration may include at least a first reference signal transmitted/received in the downlink radio frequency spectrum band and at least a second reference signal transmitted/received in the uplink radio frequency spectrum band. In some examples, the at least first reference signal may include at least one of a CRS or a CSI-RS, and the at least second reference signal may include at least one of a DM-RS or a SRS.

The radio frequency spectrum rate matching configuration determiner 545 may be used to determine a first rate matching configuration for the first downlink transmission or a second rate matching configuration for the second downlink transmission. In some examples, the radio frequency spectrum rate matching configuration determiner 545 may determine the second rate matching configuration based on the first rate matching configuration. In some examples, the second rate matching configuration may include at least one of: no CRS-related rate matching, or a second CRS-related rate matching associated with a more sparse CRS compared to a first CRS-related rate matching associated with the first rate matching configuration, or a third CRS-related rate matching associated with a dynamically present CRS, or no control region-related rate matching compared to a control region-related rate matching associated with the first downlink transmission, or a combination thereof.

In some examples, the wireless communication manager 520 may be used to communicate (e.g., with one or more base stations) based on the first cell ID and/or the second cell ID, the first QCL configuration and/or the second QCL configuration, and/or the first rate matching configuration and/or the second rate matching configuration.

The DRS processor 550 may be used to receive a DRS. In some examples, the DRS may include at least a first reference signal received in the downlink radio frequency spectrum band and at least a second reference signal received in the uplink radio frequency spectrum band. In some examples, the at least first reference signal may include at least one of a PSS, or a SSS, or a CRS, and the at least second reference signal may include at least one of a CSI-RS or a SRS. In some examples, the at least first reference signal may be associated with the first cell ID, and the at least second reference signal may be associated with the second cell ID.

The CRS processor 555 may be used to receive a first CRS associated with the first cell ID in the downlink radio frequency spectrum band and/or a second CRS associated with the second cell ID in the uplink radio frequency spectrum band. In some examples, the first CRS and the second CRS may be received, respectively, as part of the first DRS and the second DRS.

The CSI-RS processor 560 may be used to receive a CSI-RS in the downlink radio frequency spectrum band. In some examples, the CSI-RS may be associated with the first cell ID. In some examples, the CSI-RS may be received as part of the first DRS. The SRS processor 565 may be used to receive a SRS in the uplink radio frequency spectrum band. In some examples, the SRS may be associated with the second cell ID. In some examples, the SRS may be received as part of the second DRS.

The CSI feedback determiner 570 may be used to determine a first CSI feedback for the first downlink transmission or a second CSI feedback for the second downlink transmission. In some examples, the first CSI feedback may be based on the CSI-RS received by the CSI-RS processor 560, and the second CSI feedback may be based on the SRS received by the SRS processor 565.

Figure 6:
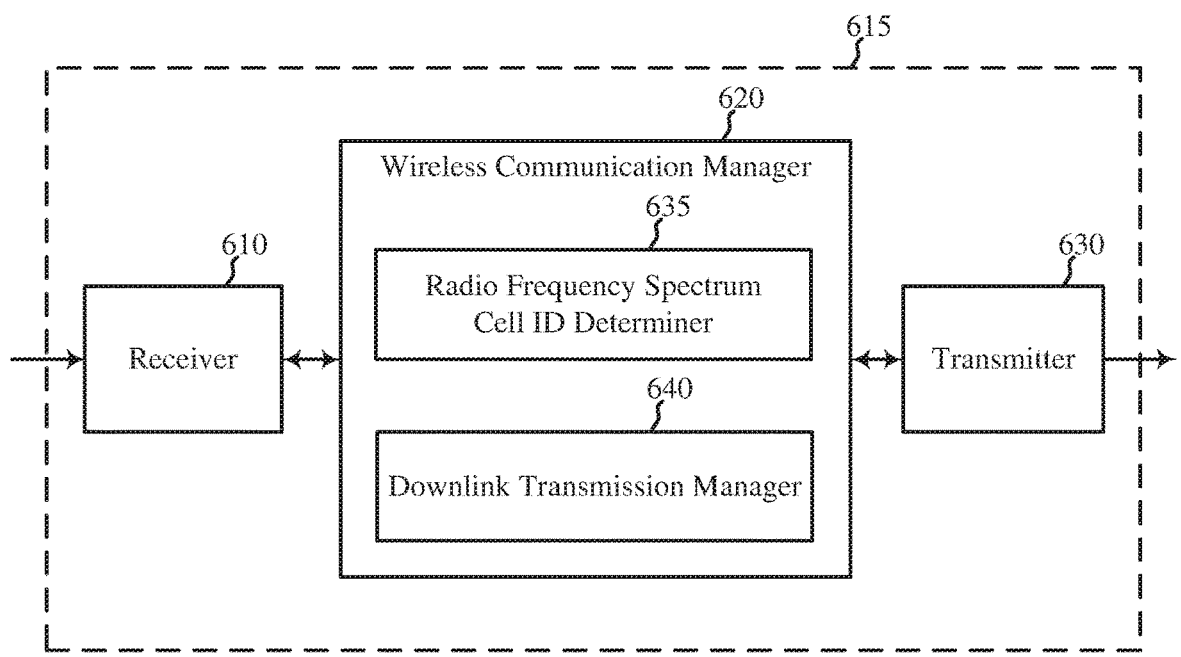
FIG. 6 shows a block diagram of an apparatus for use in wireless communication, in accordance with various aspects of the present disclosure.

FIG. 6 shows a block diagram 600 of an apparatus 615 for use in wireless communication, in accordance with various aspects of the present disclosure. The apparatus 615 may be an example of aspects of one or more of the UEs 115, 315, 315-*a*, or 315-*b* described with reference to FIG. 1 or 3. The apparatus 615 may also be or include a processor. The apparatus 615 may include a receiver 610, a wireless communication manager 620, or a transmitter 630. Each of these components may be in communication with each other.

The components of the apparatus 615 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, an SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 610 may include at least one radio frequency receiver, such as at least one radio frequency receiver operable to receive transmissions over one or more radio frequency spectrum bands. In some examples, one or more of the radio frequency spectrum bands may be used for wireless communications, as described, for example, with reference to FIG. 1, 2, or 3. The receiver 610 may be used to receive various types of data or control signals (i.e., transmissions) over one or more communication links of a wireless communication system, such as one or more communication links of the wireless communication system 100 or 300 described with reference to FIG. 1 or 3.

In some examples, the transmitter 630 may include at least one radio frequency transmitter, such as at least one radio frequency transmitter operable to transmit over the one or more radio frequency spectrum bands. The transmitter 630 may be used to transmit various types of data or control signals (i.e., transmissions) over one or more communication links of a wireless communication system, such as one or more communication links of the wireless communication system 100 or 300 described with reference to FIG. 1 or 3.

In some examples, the wireless communication manager 620 may be used to manage one or more aspects of wireless communication for the apparatus 615. In some examples, part of the wireless communication manager 620 may be incorporated into or shared with the receiver 610 or the transmitter 630. In some examples, the wireless communication manager 620 may include a radio frequency spectrum cell ID determiner 635 or a downlink transmission manager 640.

The radio frequency spectrum cell ID determiner 635 may be used to determine a cell ID associated with a downlink transmission in an uplink radio frequency spectrum band. The downlink transmission manager 640 may be used to receive the downlink transmission in a subframe of the uplink radio frequency spectrum band. The downlink transmission may be based on the cell ID and a format of a PUSCH, and may include an eight layer SU-MIMO transmission. In some examples, the downlink transmission may be associated with at least one of: eight different cyclic shifts in each of a first slot and a second slot of the subframe, a first set of four different cyclic shifts in the first slot and a second set of four different cyclic shifts in the second slot, the first set of four different cyclic shifts in a first frequency comb and the second set of four different cyclic shifts in a second frequency comb, or a combination thereof.

Figure 7:
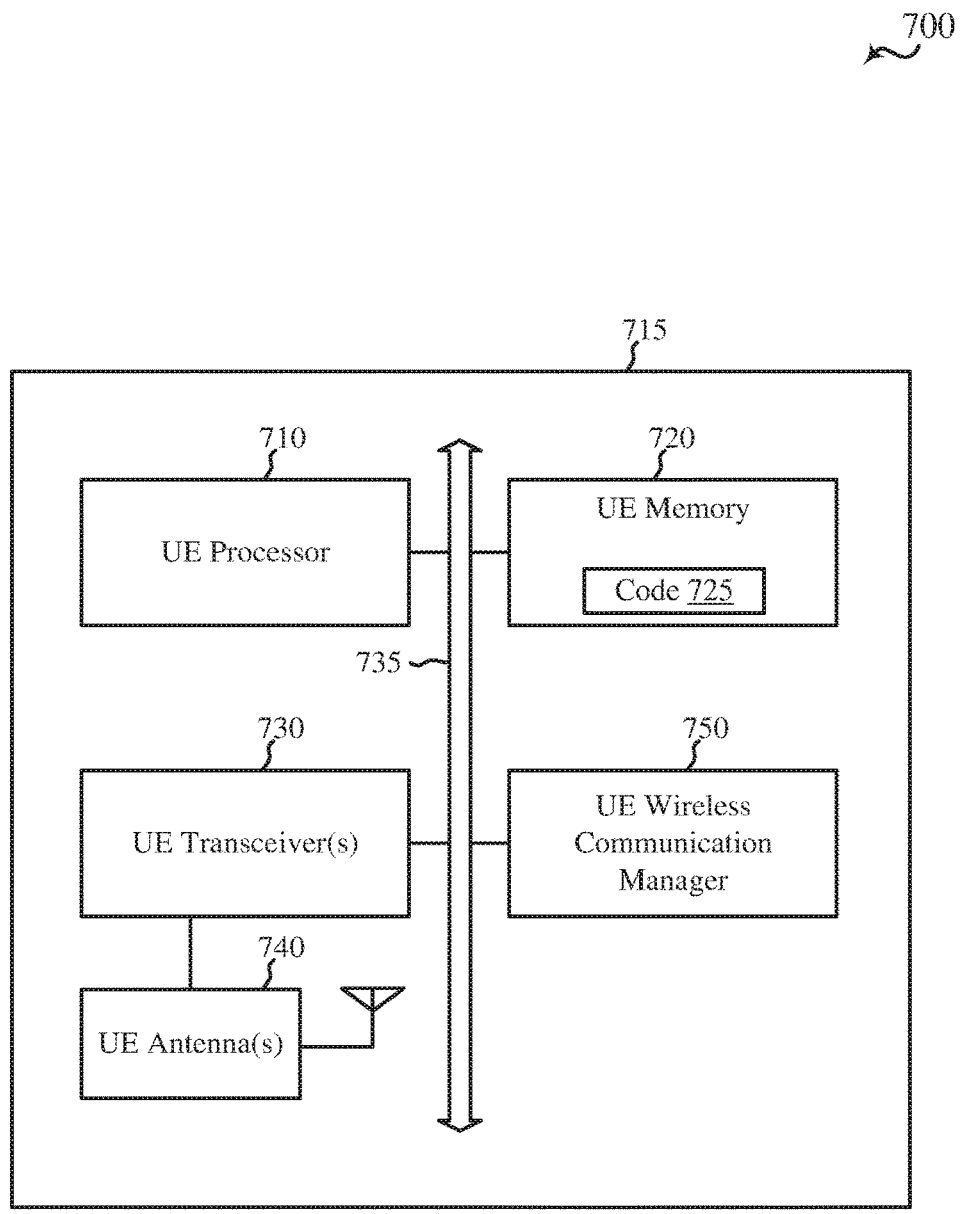
FIG. 7 shows a block diagram of a UE for use in wireless communication, in accordance with various aspects of the present disclosure.

FIG. 7 shows a block diagram 700 of a UE 715 for use in wireless communication, in accordance with various aspects of the present disclosure. The UE 715 may be included or be part of a personal computer (e.g., a laptop computer, a netbook computer, a tablet computer, etc.), a cellular telephone, a PDA, a DVR, an internet appliance, a gaming console, an e-reader, etc. The UE 715 may, in some examples, have an internal power supply (not shown), such as a small battery, to facilitate mobile operation. In some examples, the UE 715 may be an example of aspects of one or more of the UEs 115, 315, 315-*a*, or 315-*b* described with reference to FIG. 1 or 3, or aspects of the apparatus 415, 515, or 615 described with reference to FIG. 4, 5, or 6. The UE 715 may be configured to implement at least some of the UE or apparatus techniques and functions described with reference to FIG. 1, 2, 3, 4, 5, or 6.

The UE 715 may include a UE processor 710, a UE memory 720, at least one UE transceiver (represented by UE transceiver(s) 730), at least one UE antenna (represented by UE antenna(s) 740), or a UE wireless communication manager 750. Each of these components may be in communication with each other, directly or indirectly, over one or more buses 735.

The UE memory 720 may include random access memory (RAM) or read-only memory (ROM). The UE memory 720 may store computer-readable, computer-executable code 725 containing instructions that are configured to, when executed, cause the UE processor 710 to perform various functions described herein related to wireless communication, including, for example, communicating based on a first cell ID associated with a first downlink transmission in a first radio frequency spectrum band (e.g., a downlink radio frequency spectrum band) of paired radio frequency spectrum bands, and a second cell ID associated with a second downlink transmission in a second radio frequency spectrum band (e.g., an uplink radio frequency spectrum band) of the paired radio frequency spectrum bands. Alternatively, the computer-executable code 725 may not be directly executable by the UE processor 710 but be configured to cause the UE 715 (e.g., when compiled and executed) to perform various of the functions described herein.

The UE processor 710 may include an intelligent hardware device, e.g., a central processing unit (CPU), a microcontroller, an ASIC, etc. The UE processor 710 may process information received through the UE transceiver(s) 730 or information to be sent to the UE transceiver(s) 730 for transmission through the UE antenna(s) 740. The UE processor 710 may handle, alone or in connection with the UE wireless communication manager 750, various aspects of communicating over (or managing communications over) one or more radio frequency spectrum bands.

The UE transceiver(s) 730 may include a modem configured to modulate packets and provide the modulated packets to the UE antenna(s) 740 for transmission, and to demodulate packets received from the UE antenna(s) 740. The UE transceiver(s) 730 may, in some examples, be implemented as one or more UE transmitters and one or more separate UE receivers. The UE transceiver(s) 730 may support communications in one or more radio frequency spectrum bands. The UE transceiver(s) 730 may be configured to communicate bi-directionally, via the UE antenna(s) 740, with one or more of the base stations 105, 305, 305-*a*, 305-*b*, 305-*c*, or 305-*d* described with reference to FIG. 1 or 3. While the UE 715 may include a single UE antenna, there may be examples in which the UE 715 may include multiple UE antennas (e.g., UE antenna(s) 740).

The UE wireless communication manager 750 may be configured to perform or control some or all of the UE or apparatus techniques or functions described with reference to FIG. 1, 2, 3, 4, 5, or 6 related to wireless communication. The UE wireless communication manager 750, or portions of it, may include a processor, or some or all of the functions of the UE wireless communication manager 750 may be performed by the UE processor 710 or in connection with the UE processor 710. In some examples, the UE wireless communication manager 750 may be an example of the wireless communication manager 420, 520, or 620 described with reference to FIG. 4, 5, or 6.

Figure 8:
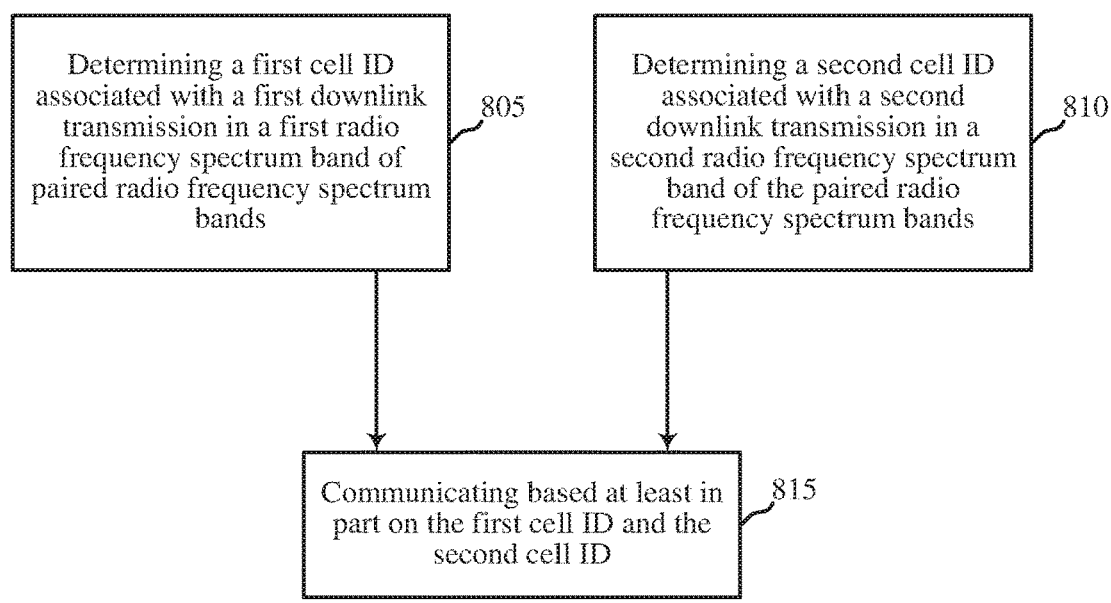
FIG. 8 is a flow chart illustrating an example of a method for wireless communication, in accordance with various aspects of the present disclosure.

FIG. 8 is a flow chart illustrating an example of a method 800 for wireless communication, in accordance with various aspects of the present disclosure. For clarity, the method 800 is described below with reference to aspects of one or more of the UEs 115, 315, 315-*a*, 315-*b*, or 715 described with reference to FIG. 1, 3, or 7, or aspects of one or more of the apparatuses 415 or 515 described with reference to FIG. 4 or 5. In some examples, a UE may execute one or more sets of codes to control the functional elements of the UE to perform the functions described below. Additionally or alternatively, the UE may perform one or more of the functions described below using special-purpose hardware.

At block 805, the method 800 may include determining a first cell ID associated with a first downlink transmission in a first radio frequency spectrum band of paired radio frequency spectrum bands. The operation(s) at block 805 may be performed using the wireless communication manager 420 or 520 or UE wireless communication manager 750 described with reference to FIG. 4, 5, or 7, or the radio frequency spectrum cell ID determiner 435 or 535 described with reference to FIG. 4 or 5.

At block 810, the method 800 may include determining a second cell ID associated with a second downlink transmission in a second radio frequency spectrum band of the paired radio frequency spectrum bands. The operation(s) at block 810 may be performed in parallel with the operation(s) at block 805, as shown, or before or after the operation(s) at block 805 (not shown). The operation(s) at block 810 may be performed using the wireless communication manager 420 or 520 or UE wireless communication manager 750 described with reference to FIG. 4, 5, or 7, or the radio frequency spectrum cell ID determiner 435 or 535 described with reference to FIG. 4 or 5.

At block 815, the method 800 may include communicating (e.g., with one or more base stations) based on the first cell ID and/or the second cell ID. The operation(s) at block 815 may be performed using the wireless communication manager 420 or 520 or UE wireless communication manager 750 described with reference to FIG. 4, 5, or 7.

In some examples of the method 800, the first radio frequency spectrum band may include a downlink radio frequency spectrum band and the second radio frequency spectrum band may include an uplink radio frequency spectrum band. In some examples, the first radio frequency spectrum band and the second radio frequency spectrum band may be associated with at least one of: different transmission power restrictions, different interference characteristics, or a combination thereof. Alternatively, the first radio frequency spectrum band and the second radio frequency spectrum band may be associated with a same set of power restrictions, and/or the first radio frequency spectrum band and the second radio frequency spectrum band may be associated with a same set of interference characteristics. The first cell ID and the second cell ID may include a same cell ID or different cell IDs. In some examples, the first cell ID and the second cell ID may include a same PCI or a same VCI.

Thus, the method 800 may provide for wireless communication. It should be noted that the method 800 is just one implementation and that the operations of the method 800 may be rearranged or otherwise modified such that other implementations are possible.

Figure 9:
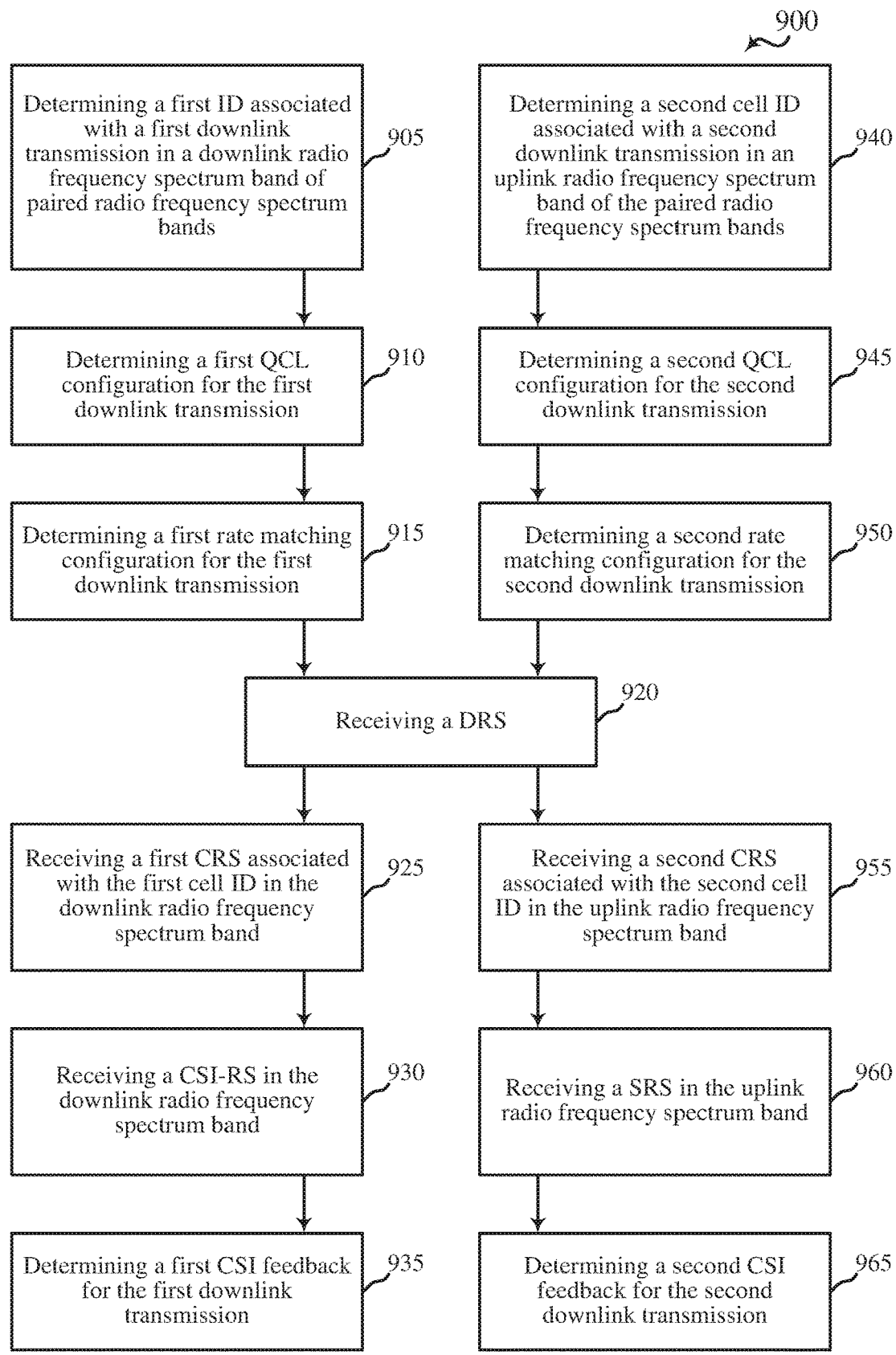
FIG. 9 is a flow chart illustrating an example of a method for wireless communication, in accordance with various aspects of the present disclosure.

FIG. 9 is a flow chart illustrating an example of a method 900 for wireless communication, in accordance with various aspects of the present disclosure. For clarity, the method 900 is described below with reference to aspects of one or more of the UEs 115, 315, 315-*a*, 315-*b*, or 715 described with reference to FIG. 1, 3, or 7, or aspects of one or more of the apparatuses 415 or 515 described with reference to FIG. 4 or 5. In some examples, a UE may execute one or more sets of codes to control the functional elements of the UE to perform the functions described below. Additionally or alternatively, the UE may perform one or more of the functions described below using special-purpose hardware. In some examples, the operation(s) of a first flow including blocks 905, 910, 915, 925, 930, or 935 may be performed in parallel with the operation(s) of a second flow including blocks 940, 945, 950, 955, 960, or 965. In some examples, the operation(s) of the first flow and the second flow may not be performed in parallel (not shown).

At block 905, the method 900 may include determining a first cell ID associated with a first downlink transmission in a downlink radio frequency spectrum band of paired radio frequency spectrum bands. The operation(s) at block 905 may be performed using the wireless communication manager 420 or 520 or UE wireless communication manager 750 described with reference to FIG. 4, 5, or 7, or the radio frequency spectrum cell ID determiner 435 or 535 described with reference to FIG. 4 or 5.

At block 940, the method 900 may include determining a second cell ID associated with a second downlink transmission in an uplink radio frequency spectrum band of the paired radio frequency spectrum bands. The operation(s) at block 940 may be performed using the wireless communication manager 420 or 520 or UE wireless communication manager 750 described with reference to FIG. 4, 5, or 7, or the radio frequency spectrum cell ID determiner 435 or 535 described with reference to FIG. 4 or 5.

In some examples, the downlink radio frequency spectrum band and the uplink radio frequency spectrum band may be associated with at least one of: different transmission power restrictions, different interference characteristics, or a combination thereof. Alternatively, the downlink radio frequency spectrum band and the uplink radio frequency spectrum band may be associated with a same set of power restrictions, and/or the downlink radio frequency spectrum band and the uplink radio frequency spectrum band may be associated with a same set of interference characteristics. The first cell ID and the second cell ID may include a same cell ID or different cell IDs. In some examples, the first cell ID and the second cell ID may include a same PCI or a same VCI.

At block 910, the method 900 may include determining a first QCL configuration for the first downlink transmission. The operation(s) at block 910 may be performed using the wireless communication manager 420 or 520 or UE wireless communication manager 750 described with reference to FIG. 4, 5, or 7, or the radio frequency spectrum QCL configuration determiner 540 described with reference to FIG. 5.

At block 945, the method 900 may include determining a second QCL configuration for the second downlink transmission. In some examples, the operation(s) at block 945 may include determining the second QCL configuration based on the first QCL configuration. The operation(s) at block 945 may be performed using the wireless communication manager 420 or 520 or UE wireless communication manager 750 described with reference to FIG. 4, 5, or 7, or the radio frequency spectrum QCL configuration determiner 540 described with reference to FIG. 5.

In some examples of the method 900, the second QCL configuration may include at least one parameter that differs from a corresponding at least one parameter of the first QCL configuration. For example, the first QCL configuration may include at least one reference signal transmitted/received in the downlink radio frequency spectrum band, and the second QCL configuration may include at least a first reference signal transmitted/received in the downlink radio frequency spectrum band and at least a second reference signal transmitted/received in the uplink radio frequency spectrum band. In some examples, the at least first reference signal may include at least one of a CRS or a CSI-RS, and the at least second reference signal may include at least one of a DM-RS or a SRS.

At block 915, the method 900 may include determining a first rate matching configuration for the first downlink transmission. The operation(s) at block 915 may be performed using the wireless communication manager 420 or 520 or UE wireless communication manager 750 described with reference to FIG. 4, 5, or 7, or the radio frequency spectrum rate matching configuration determiner 545 described with reference to FIG. 5.

At block 950, the method 900 may include determining a second rate matching configuration for the second downlink transmission. In some examples, the operation(s) at block 950 may include determining the second rate matching configuration based on the first rate matching configuration. The operation(s) at block 950 may be performed using the wireless communication manager 420 or 520 or UE wireless communication manager 750 described with reference to FIG. 4, 5, or 7, or the radio frequency spectrum rate matching configuration determiner 545 described with reference to FIG. 5.

In some examples of the method 900, the second rate matching configuration may include at least one of: no CRS-related rate matching, or a second CRS-related rate matching associated with a more sparse CRS compared to a first CRS-related rate matching associated with the first rate matching configuration, or a third CRS-related rate matching associated with a dynamically present CRS, or no control region-related rate matching compared to a control region-related rate matching associated with the first downlink transmission, or a combination thereof.

At one or more of blocks 920, 925, 930, 955, or 960, the method 900 may include communicating (e.g., with one or more base stations) based on the first cell ID and/or the second cell ID, the first QCL configuration and/or the second QCL configuration, and/or the first rate matching configuration and/or the second rate matching configuration.

At block 920, the method 900 may include receiving a DRS. In some examples, the DRS may include at least a first reference signal received in the downlink radio frequency spectrum band and at least a second reference signal received in the uplink radio frequency spectrum band. In some examples, the at least first reference signal may include at least one of a PSS, a SSS, or a CRS, and the at least second reference signal may include at least one of a CSI-RS or a SRS. In some examples, the at least first reference signal may be associated with the first cell ID, and the at least second reference signal may be associated with the second cell ID. The operation(s) at block 920 may be performed using the wireless communication manager 420 or 520 or UE wireless communication manager 750 described with reference to FIG. 4, 5, or 7, or the DRS processor 550 described with reference to FIG. 5.

At block 925, the method 900 may include receiving a first CRS associated with the first cell ID in the downlink radio frequency spectrum band. At block 955, the method 900 may include receiving a second CRS associated with the second cell ID in the uplink radio frequency spectrum band. In some examples, the first CRS and the CRS may be received, respectively, as part of the first DRS or the second DRS. The operation(s) at block 925 or 955 may be performed using the wireless communication manager 420 or 520 or UE wireless communication manager 750 described with reference to FIG. 4, 5, or 7, or the CRS processor 555 described with reference to FIG. 5.

At block 930, the method 900 may include receiving a CSI-RS in the downlink radio frequency spectrum band. In some examples, the CSI-RS may be associated with the first cell ID. At block 960, the method 900 may include receiving a SRS in the uplink radio frequency spectrum band. In some examples, the SRS may be associated with the second cell ID. In some examples, the CSI-RS or SRS may be received, respectively, as part of the first DRS or the second DRS. The operation(s) at block 930 or 960 may be performed using the wireless communication manager 420 or 520 or UE wireless communication manager 750 described with reference to FIG. 4, 5, or 7, or the CSI-RS processor 560 or SRS processor 565 described with reference to FIG. 5.

At block 935, the method 900 may include determining a first CSI feedback for the first downlink transmission. At block 965, the method 900 may include determining a second CSI feedback for the second downlink transmission. In some examples, the first CSI feedback may be based on the CSI-RS received at block 930, and the second CSI feedback may be based on the SRS received at block 960. The operation(s) at block 935 or 965 may be performed using the wireless communication manager 420 or 520 or UE wireless communication manager 750 described with reference to FIG. 4, 5, or 7, or the CSI feedback determiner 570 described with reference to FIG. 5.

Thus, the method 900 may provide for wireless communication. It should be noted that the method 900 is just one implementation and that the operations of the method 900 may be rearranged or otherwise modified such that other implementations are possible.

Figure 10:
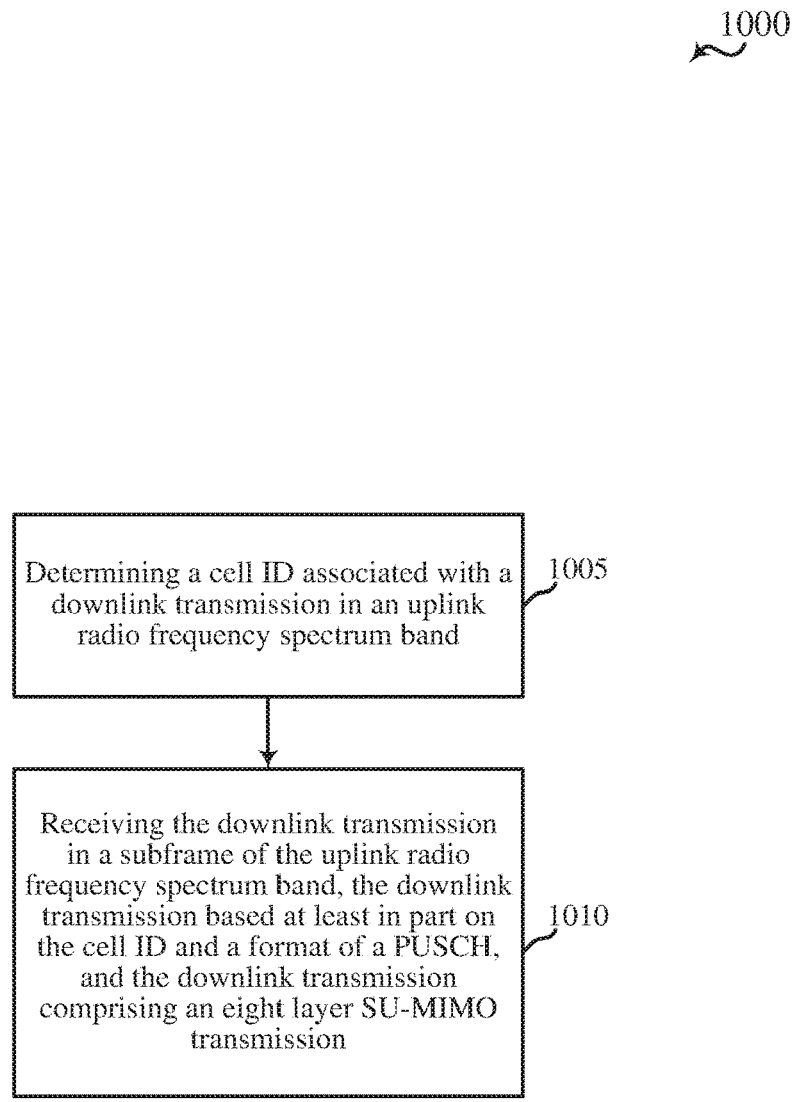
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the UEs 115, 315, 315-a, 315-b, or 715 described with reference to FIG. 1, 3, or 7, or aspects of the apparatus

615 described with reference to FIG. 6. In some examples, a UE may execute one or more sets of codes to control the functional elements of the UE to perform the functions described below. Additionally or alternatively, the UE may perform one or more of the functions described below using special-purpose hardware.

At block 1005, the method 1000 may include determining a cell ID associated with a downlink transmission in an uplink radio frequency spectrum band. The operation(s) at block 1005 may be performed using the wireless communication manager 620 or UE wireless communication manager 750 described with reference to FIG. 6 or 7, or the radio frequency spectrum cell ID determiner 635 described with reference to FIG. 6.

At block 1010, the method 1000 may include receiving the downlink transmission in a subframe of the uplink radio frequency spectrum band. The downlink transmission may be based on the cell ID and a format of a PUSCH, and may include an eight layer SU-MIMO transmission. In some examples, the downlink transmission may be associated with at least one of: eight different cyclic shifts in each of a first slot and a second slot of the subframe, a first set of four different cyclic shifts in the first slot and a second set of four different cyclic shifts in the second slot, the first set of four different cyclic shifts in a first frequency comb and the second set of four different cyclic shifts in a second frequency comb, or a combination thereof. The operation(s) at block 1010 may be performed using the wireless communication manager 620 or UE wireless communication manager 750 described with reference to FIG. 6 or 7, or the downlink transmission manager 640 described with reference to FIG. 6.

Thus, the method 1000 may provide for wireless communication. It should be noted that the method 1000 is just one implementation and that the operations of the method 1000 may be rearranged or otherwise modified such that other implementations are possible.

In some examples, aspects from two or more of the methods 800, 900, or 1000 described with reference to FIG. 8, 9, or 10 may be combined. It should be noted that the methods 800, 900, or 1000 are just example implementations, and that the operations of the methods 800, 900, or 1000 may be rearranged or otherwise modified such that other implementations are possible.

Techniques described herein may be used for various wireless communications systems such as CDMA, TDMA, FDMA. OFDMA, single-carrier FDMA (SC-FDMA), and other systems. The terms "system" and "network" are often used interchangeably. A CDMA system may implement a radio technology such as CDMA2000. Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi). IEEE 802.16 (WiMAX). IEEE 802.20, Flash-OFDM™, etc. UTRA and E-UTRA are part of Universal Mobile Telecommunication System (UMTS). 3GPP LTE and LTE-A are releases of UMTS that use E-UTRA. UTRA. E-UTRA. UMTS, LTE. LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration." and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices. e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example. "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communications at a user equipment (UE), comprising:
    determining a first cell identifier (ID) associated with a first downlink transmission in a first radio frequency spectrum band of paired radio frequency spectrum bands, the first radio frequency spectrum band is a downlink radio frequency spectrum band;
    determining a second cell ID associated with a second downlink transmission in a second radio frequency spectrum band of the paired radio frequency spectrum bands, the second radio frequency spectrum band is an uplink radio frequency spectrum band; and
    communicating based at least in part on the first cell ID and the second cell ID.

2. The method of claim 1, further comprising: determining a second quasi-co-location (QCL) configuration for the second downlink transmission.

3. The method of claim 2, further comprising:
    determining a first QCL configuration for the first downlink transmission; wherein the second QCL configuration is determined based at least in part on the first QCL configuration.

4. The method of claim 2, wherein the second QCL configuration comprises at least a first reference signal received in the downlink radio frequency spectrum band and at least a second reference signal received in the uplink radio frequency spectrum band.

5. The method of claim 4, wherein the at least first reference signal comprises at least one of a cell-specific reference signal (CRS) or a channel state information reference signal (CSI-RS), and the at least second reference signal comprises at least one of a demodulation reference signal (DM-RS) or a sounding reference signal (SRS).

6. The method of claim 1, further comprising:
    determining a second rate matching configuration for the second downlink transmission.

7. The method of claim 6, further comprising:
    determining a first rate matching configuration for the first downlink transmission;
    wherein the second rate matching configuration is determined based at least in part on the first rate matching configuration.

8. The method of claim 6, wherein the second rate matching configuration comprises at least one of: no CRS-related rate matching, or a second CRS-related rate matching associated with a more sparse CRS compared to a first CRS-related rate matching associated with the first downlink transmission, or a third CRS-related rate matching associated with a dynamically present CRS, or no control region-related rate matching compared to a control region-related rate matching associated with the first downlink transmission, or a combination thereof.

9. The method of claim 1, wherein the first cell ID differs from the second cell ID, and wherein the communicating comprises:
    receiving a first CRS associated with the first cell ID in the downlink radio frequency spectrum band; and
    receiving a second CRS associated with the second cell ID in the uplink radio frequency spectrum band.

10. The method of claim 1, wherein the first cell ID and the second cell ID comprise a same cell ID, and wherein the communicating comprises:
    receiving a first CRS associated with the first cell ID in the downlink radio frequency spectrum band; and
    receiving a second CRS associated with the second cell ID in the uplink radio frequency spectrum band.

11. The method of claim 1, further comprising:
    determining a first channel state information (CSI) feedback for the first downlink transmission; and
    determining a second CSI feedback for the second downlink transmission.

12. The method of claim 11, further comprising:
    receiving a CSI-RS in the downlink radio frequency spectrum band; and receiving a sounding reference signal (SRS) in the uplink radio frequency spectrum band;
wherein the first CSI feedback is based at least in part on the CSI-RS, and the second CSI feedback is based at least in part on the SRS.

13. The method of claim 1, wherein the communicating comprises: receiving a DRS.

14. The method of claim 13, wherein the DRS comprises at least a first reference signal received in the downlink radio frequency spectrum band and at least a second reference signal received in the uplink radio frequency spectrum band.

15. The method of claim 14, wherein the at least first reference signal comprises at least one of a primary synchronization signal (PSS), or a secondary synchronization signal (SSS), or a CRS, and wherein the at least second reference signal comprises at least one of a CSI-RS or a SRS.

16. The method of claim 1, wherein the first radio frequency spectrum band and the second radio frequency spectrum band are associated with at least one of: different transmission power restrictions, or different interference characteristics, or a combination thereof.

17. The method of claim 1, wherein the first cell ID and the second cell ID comprise a same physical cell ID (PCI) or a same virtual cell ID (VCI).

18. The method of claim 1, wherein the communicating comprises: receiving the second downlink transmission in a subframe of the second radio frequency spectrum band, the second downlink transmission based at least in part on the second cell ID and a format of a physical uplink shared channel (PUSCH), and the second downlink transmission comprising an eight layer single-user multiple-input multiple-output (SU-MIMO) transmission.

19. The method of claim 18, wherein the second downlink transmission is associated with at least one of: eight different cyclic shifts in each of a first slot and a second slot of the subframe, or a first set of four different cyclic shifts in the first slot and a second set of four different cyclic shifts in the second slot, or the first set of four different cyclic shifts in a first frequency comb and the second set of four different cyclic shifts in a second frequency comb, or a combination thereof.

20. An apparatus for wireless communications at a user equipment (UE), comprising:
means for determining a first cell identifier (ID) associated with a first downlink transmission in a first radio frequency spectrum band of paired radio frequency spectrum bands the first radio frequency spectrum band is a downlink radio frequency spectrum band;
means for determining a second cell ID associated with a second downlink transmission in a second radio frequency spectrum band of the paired radio frequency spectrum bands, the second radio frequency spectrum band is an uplink radio frequency spectrum band; and
means for communicating based at least in part on the first cell ID and the second cell ID.

21. The apparatus of claim 20, further comprising:
means for determining a second quasi-co-location (QCL) configuration for the second downlink transmission.

22. The apparatus of claim 21, further comprising:
means for determining a first QCL configuration for the first downlink transmission;
wherein the second QCL configuration is determined based at least in part on the first QCL configuration.

23. The apparatus of claim 21, wherein the second QCL configuration comprises at least a first reference signal received in the downlink radio frequency spectrum band and at least a second reference signal received in the uplink radio frequency spectrum band.

24. The apparatus of claim 23, wherein the at least first reference signal comprises at least one of a cell-specific reference signal (CRS) or a channel state information reference signal (CSI-RS), and the at least second reference signal comprises at least one of a demodulation reference signal (DM-RS) or a sounding reference signal (SRS).

25. The apparatus of claim 20, further comprising:
means for determining a second rate matching configuration for the second downlink transmission.

26. The apparatus of claim 25, further comprising:
means for determining a first rate matching configuration for the first downlink transmission;
wherein the second rate matching configuration is determined based at least in part on the first rate matching configuration.

27. An apparatus for wireless communications at a user equipment (UE), comprising:
a processor;
memory coupled to the processor; and
the processor and the memory configured to:
determine a first cell identifier (ID) associated with a first downlink transmission in a first radio frequency spectrum band of paired radio frequency spectrum bands, the first radio frequency spectrum band is a downlink radio frequency spectrum band;
determine a second cell ID associated with a second downlink transmission in a second radio frequency spectrum band of the paired radio frequency spectrum bands, the second radio frequency spectrum band is an uplink radio frequency spectrum band; and
communicate based at least in part on the first cell ID and the second cell ID.

28. A non-transitory computer-readable medium storing computer-executable code for wireless communications, the code executable by a processor to:
determine a first cell identifier (ID) associated with a first downlink transmission in a first radio frequency spectrum band of paired radio frequency spectrum bands, the first radio frequency spectrum band is a downlink radio frequency spectrum band;
determine a second cell ID associated with a second downlink transmission in a second radio frequency spectrum band of the paired radio frequency spectrum bands, the second radio frequency spectrum band is an uplink radio frequency spectrum band; and
communicate based at least in part on the first cell ID and the second cell ID.

* * * * *